(12) United States Patent
Miller

(10) Patent No.: US 6,551,210 B2
(45) Date of Patent: Apr. 22, 2003

(54) CONTINUOUSLY VARIABLE TRANSMISSION

(75) Inventor: Donald C. Miller, Fallbrook, CA (US)

(73) Assignee: Motion Technologies, LLC., Fallbrook, CA (US)

( * ) Notice: Subject to any disclaimer, the term of this patent is extended or adjusted under 35 U.S.C. 154(b) by 0 days.

(21) Appl. No.: 10/141,652

(22) Filed: May 7, 2002

(65) Prior Publication Data

US 2002/0170799 A1 Nov. 21, 2002

Related U.S. Application Data

(63) Continuation of application No. 09/695,757, filed on Oct. 24, 2000, now Pat. No. 6,419,608.

(51) Int. Cl.[7] .............................................. F16H 15/48
(52) U.S. Cl. ................................. 475/189; 476/38
(58) Field of Search ............................. 475/189, 195, 475/192; 476/37, 38

(56) References Cited

U.S. PATENT DOCUMENTS

| | | | |
|---|---|---|---|
| 1,175,677 A | 3/1916 | Barnes | |
| 1,858,696 A | 5/1932 | Weiss | |
| 2,469,653 A | 5/1949 | Kopp | 74/200 |
| 2,675,713 A | 4/1954 | Acker | 74/200 |
| 2,931,234 A | 4/1960 | Hayward | 74/200 |
| 2,931,235 A | 4/1960 | Hayward | 74/200 |
| 3,248,960 A | 5/1966 | Schottler | 74/200 |
| 3,273,468 A | 9/1966 | Allen | 91/420 |
| 3,487,727 A | 1/1970 | Gustafsson | 74/796 |
| 3,707,888 A | 1/1973 | Schottler | 74/796 |
| 3,996,807 A | 12/1976 | Adams | 74/190.5 |
| 4,391,156 A | 7/1983 | Tibbals, Jr. | 74/336.5 |
| 4,735,430 A | 4/1988 | Tomkinson | 280/236 |
| 4,756,211 A | 7/1988 | Fellows | 74/740 |
| 4,856,374 A | 8/1989 | Kreuzer | 74/740 |
| 4,869,130 A * | 9/1989 | Wiecko | 475/189 |
| 4,900,046 A | 2/1990 | Aranceta-Angoitia | 280/260 |
| 4,909,101 A | 3/1990 | Terry | 475/16 |
| 5,020,384 A | 6/1991 | Kraus | 74/200 |
| 5,236,403 A | 8/1993 | Schievelbusch | 476/38 |
| 5,318,486 A | 6/1994 | Lutz | 475/214 |
| 6,241,636 B1 | 6/2001 | Miller | 476/38 |
| 6,322,475 B2 | 11/2001 | Miller | 476/5 |
| 6,419,608 B1 * | 7/2002 | Miller | 475/189 |

FOREIGN PATENT DOCUMENTS

| | | |
|---|---|---|
| CN | 1157379 A | 8/1997 |
| DE | 2 310 880 | 9/1974 |
| DE | 21 36 243 | 1/1975 |
| DE | 39 40 919 A1 | 6/1991 |
| EP | 0 432 742 A1 | 12/1990 |
| GB | 592320 | 9/1947 |
| GB | 1 376 057 | 12/1974 |
| GB | 2 035 482 | 6/1980 |
| GB | 2 080 452 | 2/1982 |
| JP | 55-135259 | 4/1979 |
| WO | WO99/20918 | 4/1999 |

* cited by examiner

*Primary Examiner*—Dirk Wright
(74) *Attorney, Agent, or Firm*—Knobbe, Martens, Olson & Bear, LLP

(57) ABSTRACT

A continuously variable transmission is disclosed for use in rotationally or linearly powered machines and vehicles. The single axle transmission provides a simple manual shifting method for the user. An additional embodiment is disclosed which shifts automatically dependent upon the rotational speed of the wheel. Further, the practical commercialization of traction roller transmissions requires improvements in the reliability, ease of shifting, function and simplicity of the transmission. The disclosed transmission may be used in vehicles such as automobiles, motorcycles, and bicycles. The transmission may, for example, be driven by a power transfer mechanism such as a sprocket, gear, pulley or lever, optionally driving a one way clutch attached at one end of the main shaft.

106 Claims, 16 Drawing Sheets

CONTINUOUSLY VARIABLE TRANSMISSION

RELATED APPLICATIONS

This application is a continuation and claims the benefit of, and incorporates by reference in its entirety, the U.S. application Ser. No. 09/695,757, filed on Oct. 24, 2000, now U.S. Pat. No. 6,419,608.

BACKGROUND OF THE INVENTION

1. Field of the Invention

The field of the invention relates to transmissions. More particularly the invention relates to continuously variable transmissions.

2. Description of the Related Art

In order to provide an infinitely variable transmission, various traction roller transmissions in which power is transmitted through traction rollers supported in a housing between torque input and output discs have been developed. In such transmissions, the traction rollers are mounted on support structures which, when pivoted, cause the engagement of traction rollers with the torque discs in circles of varying diameters depending on the desired transmission ratio.

However, the success of these traditional solutions has been limited. For example, in U.S. Pat. No. 5,236,403 to Schievelbusch, a driving hub for a vehicle with a variable adjustable transmission ratio is disclosed. Schievelbusch teaches the use of two iris plates, one on each side of the traction rollers, to tilt the axis of rotation of each of the rollers. However, the use of iris plates can be very complicated due to the large number of parts which are required to adjust the iris plates during shifting the transmission. Another difficulty with this transmission is that it has a guide ring which is configured to be predominantly stationary in relation to each of the rollers. Since the guide ring is stationary, shifting the axis of rotation of each of the traction rollers is difficult. Yet another limitation of this design is that it requires the use of two half axles, one on each side of the rollers, to provide a gap in the middle of the two half axles. The gap is necessary because the rollers are shifted with rotating motion instead of sliding linear motion. The use of two axles is not desirable and requires a complex fastening system to prevent the axles from bending when the transmission is accidentally bumped, is as often the case when a transmission is employed in a vehicle. Yet another limitation of this design is that it does not provide for an automatic transmission.

Therefore, there is a need for a continuously variable transmission with a simpler shifting method, a single axle, and a support ring having a substantially uniform outer surface. Additionally, there is a need for an automatic traction roller transmission that is configured to shift automatically. Further, the practical commercialization of traction roller transmissions requires improvements in the reliability, ease of shifting, function and simplicity of the transmission.

SUMMARY OF THE INVENTION

The present invention includes a transmission for use in rotationally or linearly powered machines and vehicles. For example the present transmission may be used in machines such as drill presses, turbines, and food processing equipment, and vehicles such as automobiles, motorcycles, and bicycles. The transmission may, for example, be driven by a power transfer mechanism such as a sprocket, gear, pulley or lever, optionally driving a one way clutch attached at one end of the main shaft.

In one embodiment of the invention, the transmission comprises a rotatable driving member, three or more power adjusters, wherein each of the power adjusters respectively rotates about an axis of rotation that is centrally located within each of the power adjusters, a support member providing a support surface that is in frictional contact with each of the power adjusters, wherein the support member rotates about an axis that is centrally located within the support member, at least one platform for actuating axial movement of the support member and for actuating a shift in the axis of rotation of the power adjusters, wherein the platform provides a convex surface, at least one stationary support that is non-rotatable about the axis of rotation that is defined by the support member, wherein the at least one stationary support provides a concave surface, and a plurality of spindle supports, wherein each of the spindle supports are slidingly engaged with the convex surface of the platform and the concave surface of the stationary support, and wherein each of the spindle supports adjusts the axes of rotation of the power adjusters in response to the axial movement of the platform.

In another embodiment, the transmission comprises a rotatable driving member; three or more power adjusters, wherein each of the power adjusters respectively rotates about an axis of rotation that is respectively central to the power adjusters, a support member providing a support surface that is in frictional contact with each of the power adjusters, a rotatable driving member for rotating each of the power adjusters, a bearing disc having a plurality of inclined ramps for actuating the rotation of the driving member, a coiled spring for biasing the rotatable driving member against the power adjusters, at least one lock pawl ratchet, wherein the lock pawl ratchet is rigidly attached to the rotatable driving member, wherein the at least one lock pawl is operably attached to the coiled spring, and at least one lock pawl for locking the lock pawl ratchet in response to the rotatable driving member becoming disengaged from the power adjusters.

In still another embodiment, the transmission comprises a rotatable driving member, three or more power adjusters, wherein each of the power adjusters respectively rotates about an axis that is respectively central to each of the power adjusters, a support member providing a support surface that is in frictional contact with each of the power adjusters, wherein the support member rotates about an axis that is centrally located within the support member, a bearing disc having a plurality of inclined ramps for actuating the rotation of the driving member, a screw that is coaxially and rigidly attached to the rotatable driving member or the bearing disc, and a nut that, if the screw is attached to the rotatable driving member, is coaxially and rigidly attached to the bearing disc, or if the screw is rigidly attached to the bearing disc, coaxially and rigidly attached to the rotatable driving member, wherein the inclined ramps of the bearing disc have a higher lead than the screw.

DETAILED DESCRIPTION OF THE PREFERRED EMBODIMENT

The following detailed description is directed to certain specific embodiments of the invention. However, the invention can be embodied in a multitude of different ways as defined and covered by the claims. In this description, reference is made to the drawings wherein like parts are designated with like numerals throughout. Furthermore, embodiments of the invention may include several novel features, no single one of which is solely responsible for its desirable attributes or which is essential to practicing the inventions herein described.

The present invention includes a continuously variable transmission that may be employed in connection with any type of machine that is in need of a transmission. For example, the transmission may be used in (i) a motorized vehicle such as an automobile, motorcycle, or watercraft, (ii) a non-motorized vehicle such as a bicycle, tricycle, scooter, exercise equipment or (iii) industrial equipment, such as a drill press, power generating equipment, or textile mill.

Figure 1:
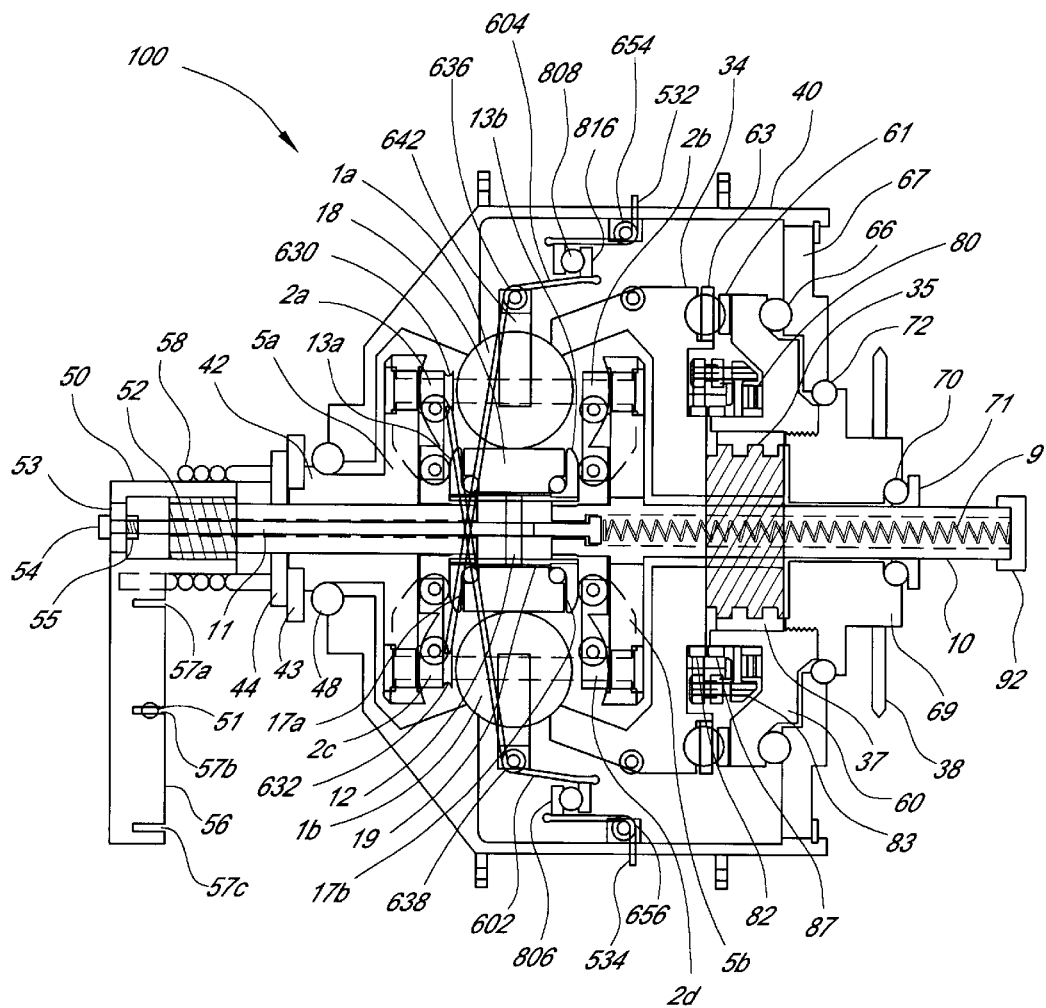
FIG. 1 is a cutaway side view of the transmission of the present invention.
Figure 2:
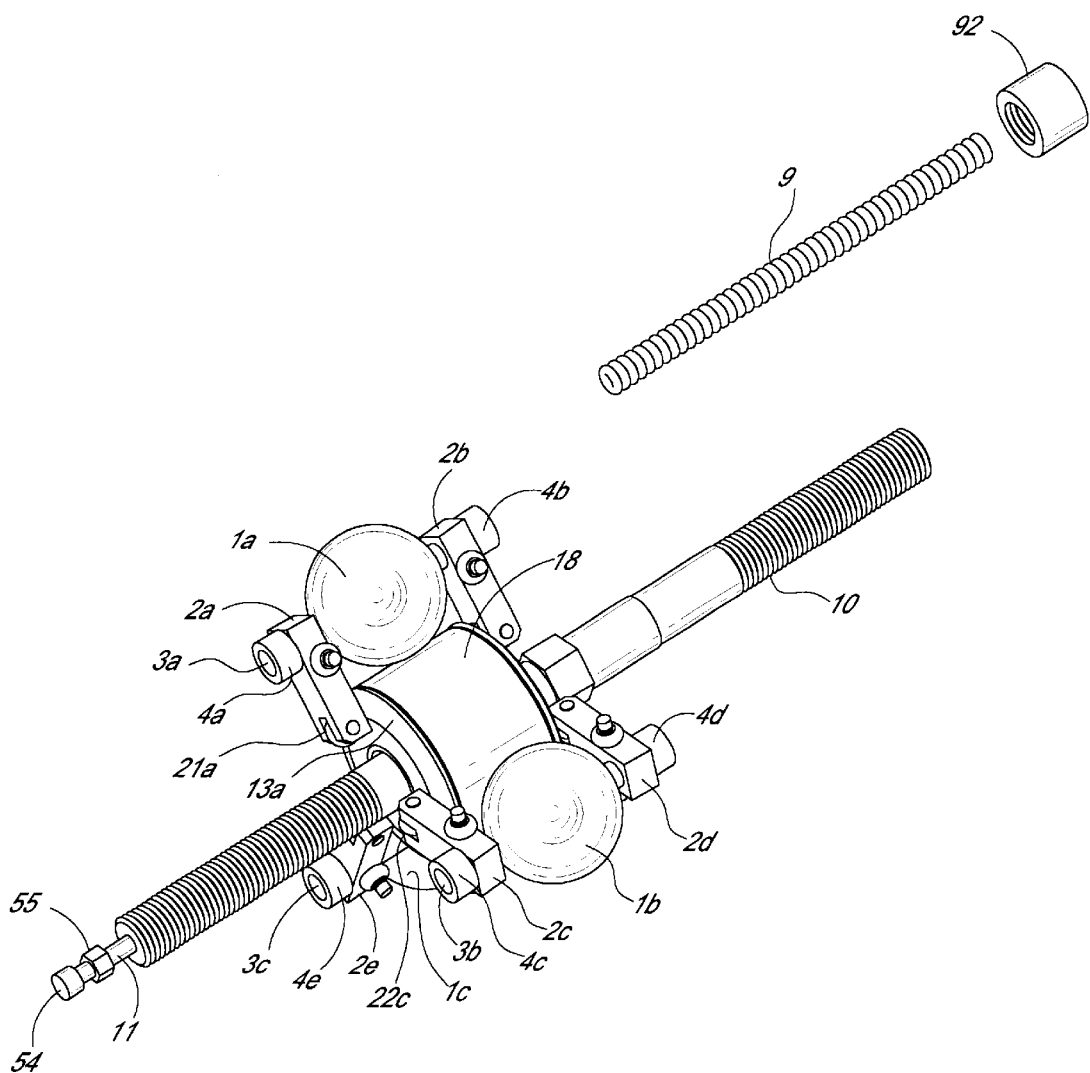
FIG. 2 is a partial perspective view of the transmission of FIG. 1.

Referring to FIGS. 1 and 2, a continuously variable transmission 100 is disclosed. The transmission 100 is shrouded in a hub shell 40 covered by a hub cap 67. At the heart of the transmission 100 are three or more power adjusters 1a, 1b, 1c which are spherical in shape and are circumferentially spaced equally around the centerline or axis of rotation of the transmission 100. As seen more clearly in FIG. 2, spindles 3a, 3b, 3c are inserted through the center of the power adjusters 1a, 1b, 1c to define an axis of rotation for the power adjusters 1a, 1b, 1c. In FIG. 1, the power adjuster's axis of rotation is shown in the horizontal direction. Spindle supports 2a–f are attached perpendicular to and at the exposed ends of the spindles 3a, 3b, 3c. In one embodiment, each of the spindles supports have a bore to receive one end of one of the spindles 3a, 3b, 3c. The spindles 3a, 3b, 3c also have spindle rollers 4a–f coaxially and slidingly positioned over the exposed ends of the spindles 3a, 3b, 3c outside of the spindle supports 2a–f.

Figure 3:
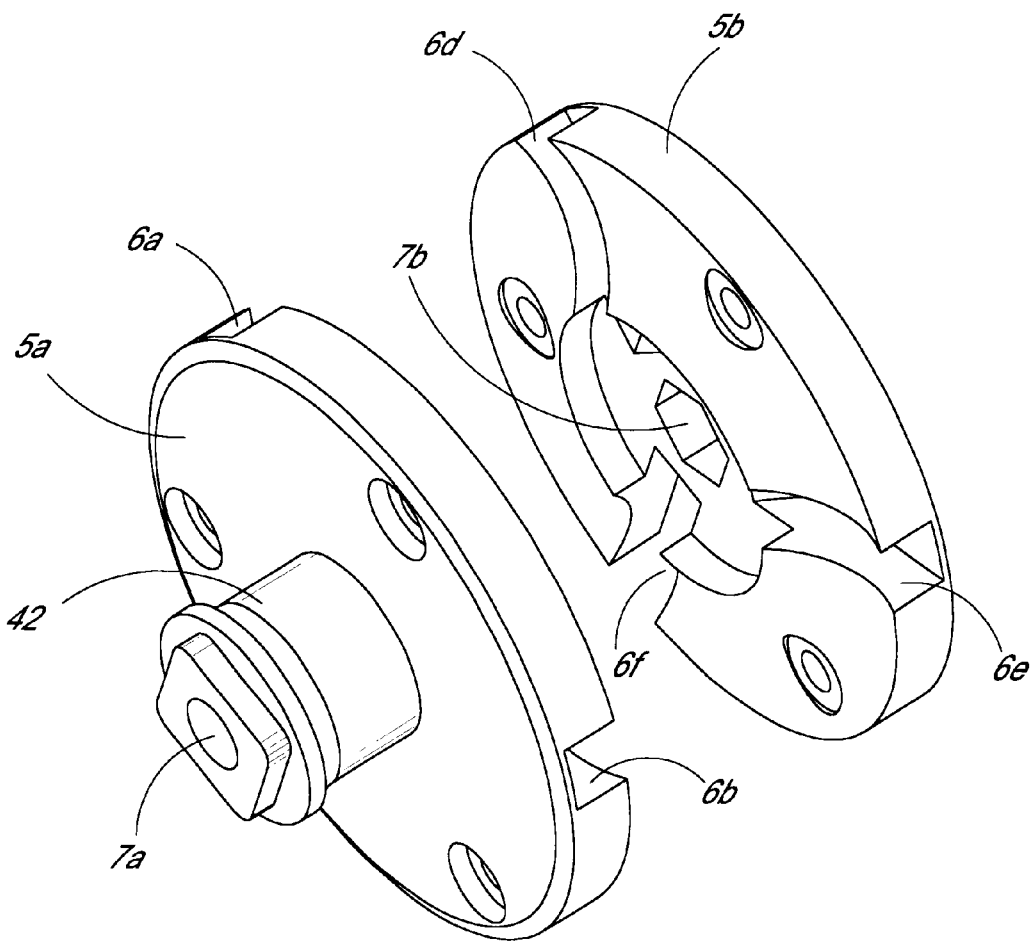
FIG. 3 is a perspective view of two stationary supports of the transmission of FIG. 1.

As the rotational axis of the power adjusters 1a, 1b, 1c is changed by tilting the spindles 3a, 3b, 3c, each spindle roller 4a–f follows in a groove 6a–f cut into a stationary support 5a, 5b. Referring to FIGS. 1 and 3, the stationary supports 5a, 5b are generally in the form of parallel discs with an axis of rotation along the centerline of the transmission 100. The grooves 6a–f extend from the outer circumference of the stationary supports 5a, 5b towards the centerline of the transmission 100. While the sides of the grooves 6a–f are substantially parallel, the bottom surface of the grooves 6a–f forms a decreasing radius as it runs towards the centerline of the transmission 100. As the transmission 100 is shifted to a lower or higher gear by changing the rotational axes of the power adjusters 1a, 1b, 1c, each pair of spindle rollers 4a–f, located on a single spindle 3a, 3b, 3c, moves in opposite directions along their corresponding grooves 6a–f.

Figure 4:
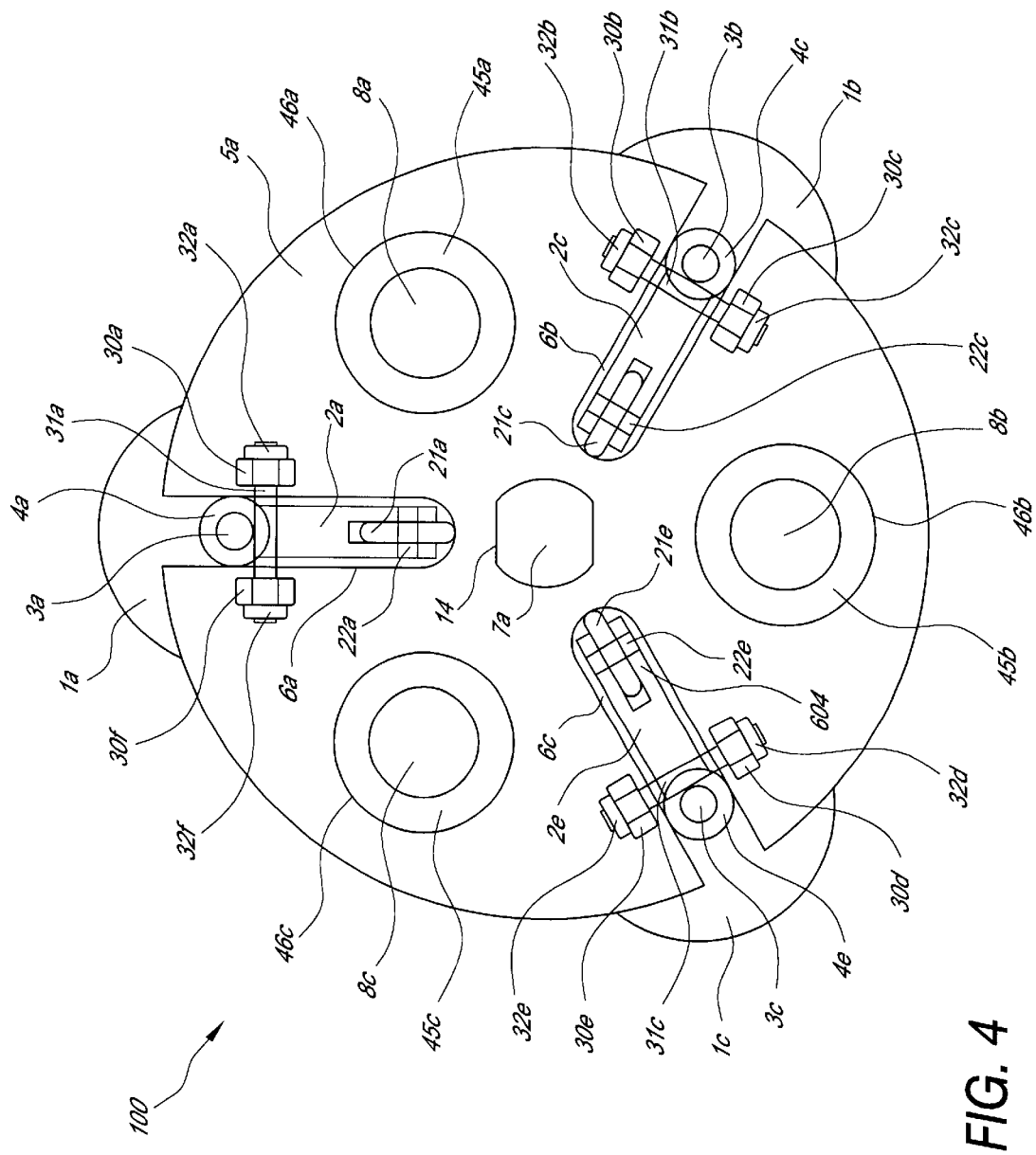
FIG. 4 is a partial end, cross-sectional view of the transmission of FIG. 1.

Referring to FIGS. 1 and 3, a centerline hole 7a, 7b in the stationary supports 5a, 5b allows the insertion of a hollow shaft 10 through both stationary supports 5a, 5b. Referring to FIG. 4, in an embodiment of the invention, one or more of the stationary support holes 7a, 7b may have a non-cylindrical shape 14, which fits over a corresponding non-cylindrical shape 15 along the hollow shaft 10 to prevent any relative rotation between the stationary supports 5a, 5b and the hollow shaft 10. If the rigidity of the stationary supports 5a, 5b is insufficient, additional structure may be used to minimize any relative rotational movement or flexing of the stationary supports 5a, 5b. This type of movement by the stationary supports 5a, 5b may cause binding of the spindle rollers 4a–f as they move along the grooves 6a–f.

Figure 7:
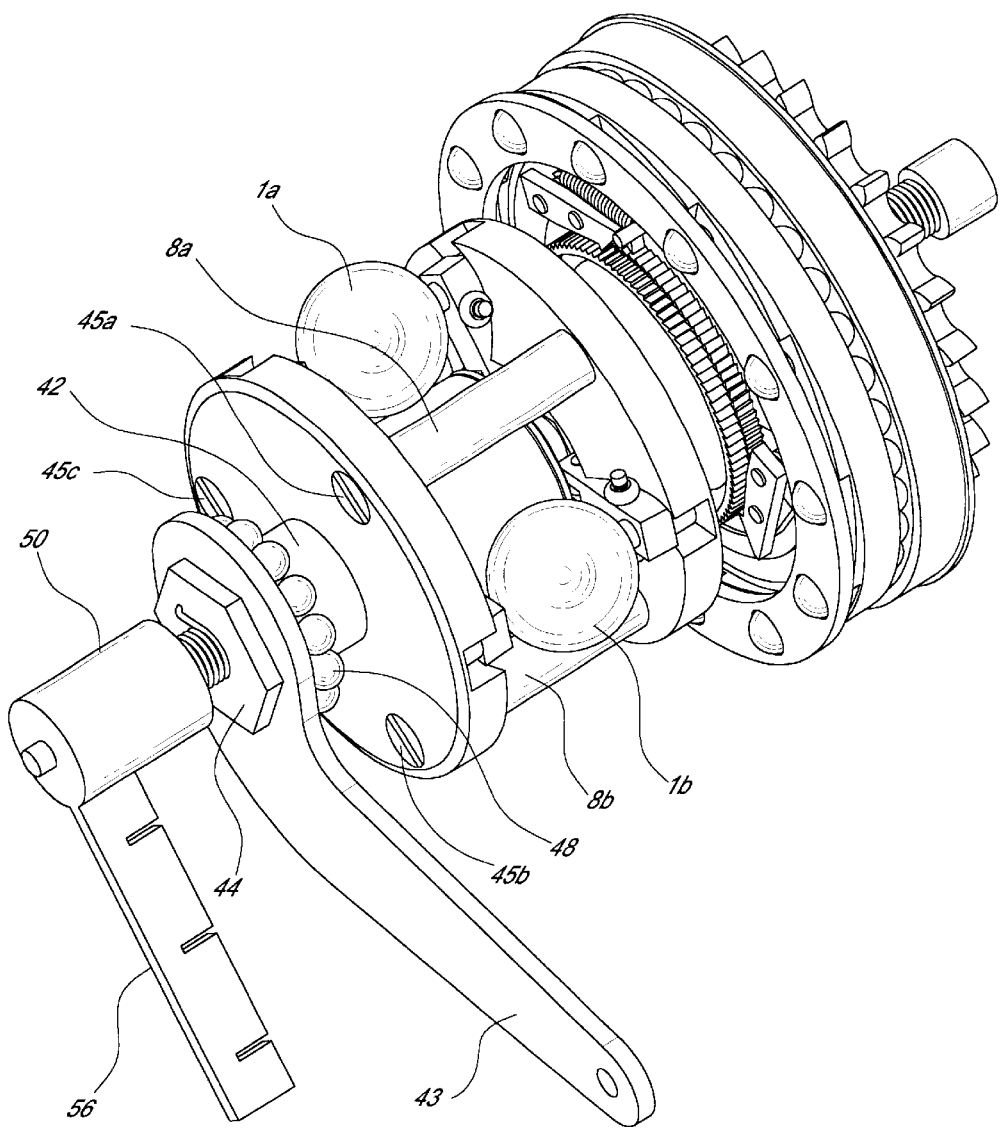
FIG. 7 is partial perspective view of the transmission of FIG. 1, wherein, among other things, a rotatable drive disc has been removed.
Figure 8:
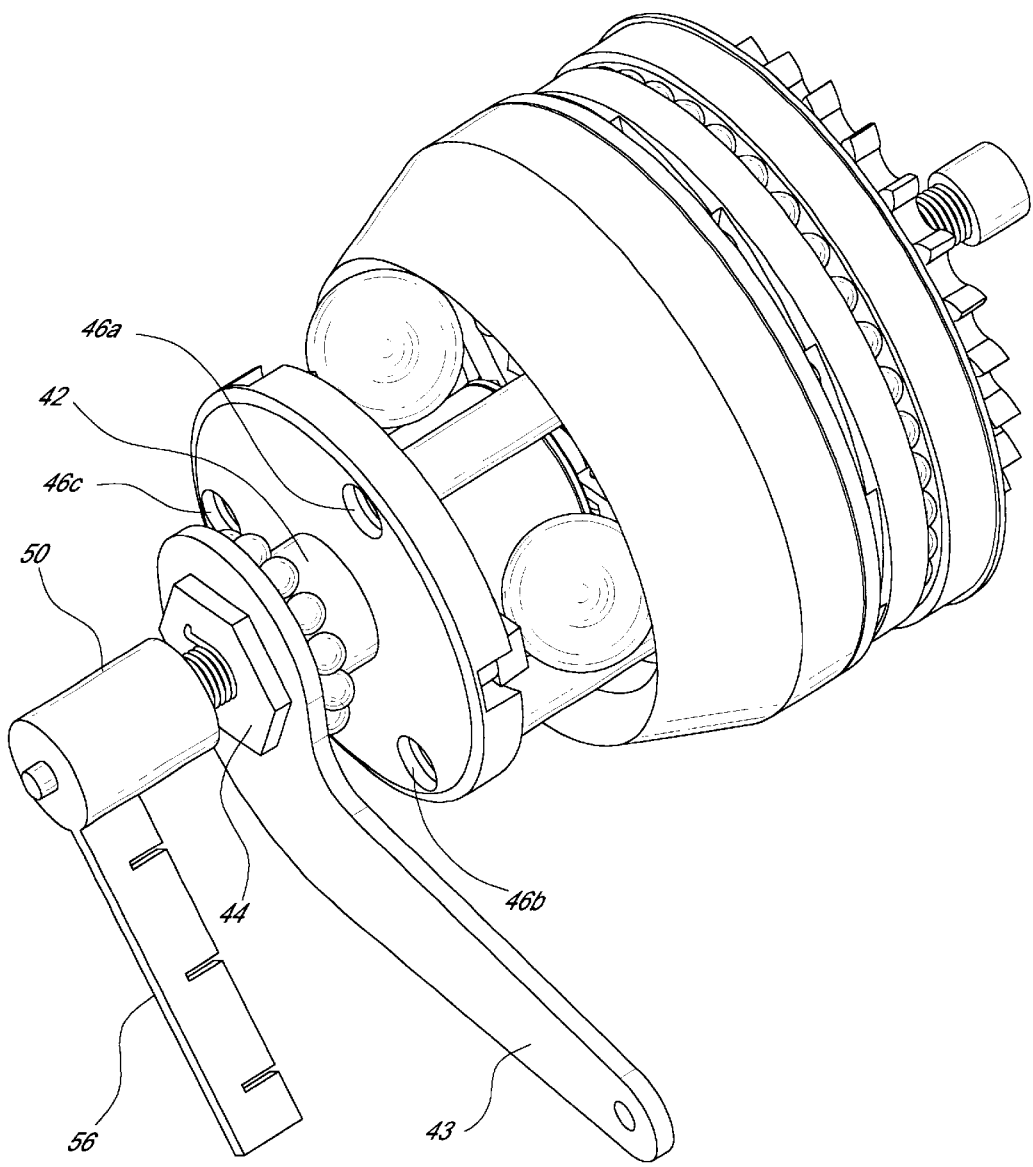
FIG. 8 is a partial perspective view of the transmission of FIG. 1, wherein, among other things, the hub shell has been removed.
Figure 9:
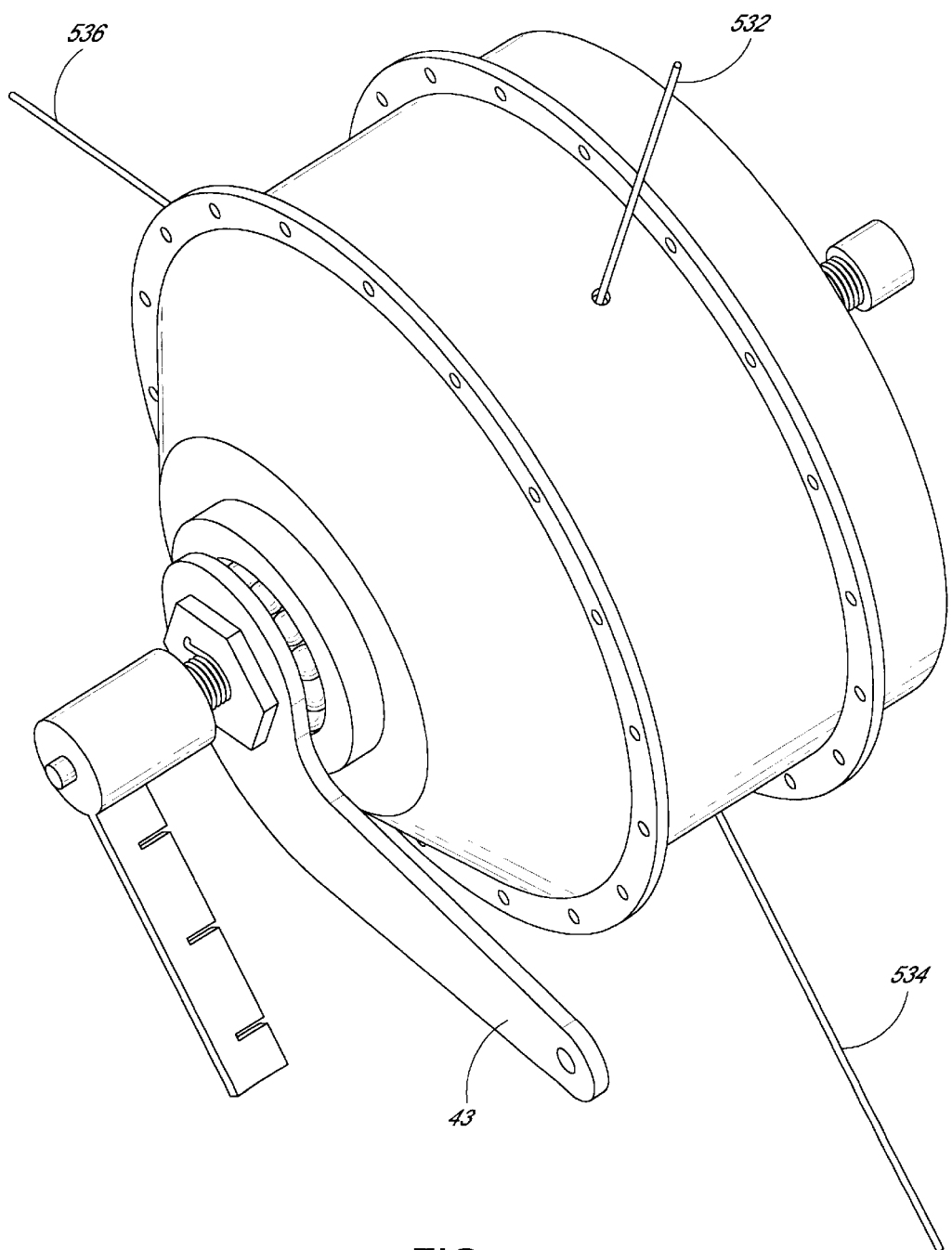
FIG. 9 is a partial perspective view of the transmission of FIG. 1, wherein the shifting is done automatically.

As shown in FIGS. 4 and 7, the additional structure may take the form of spacers 8a, 8b, 8c attached between the stationary supports 5a, 5b. The spacers 8a, 8b, 8c add rigidity between the stationary supports 5a, 5b and, in one embodiment, are located near the outer circumference of the stationary supports 5a, 5b. In one embodiment, the stationary supports 5a, 5b are connected to the spacers 8a, 8b, 8c by bolts or other fastener devices 45a–f inserted through holes 46a–f in the stationary supports 5a, 5b.

Referring back to FIGS. 1 and 3, the stationary support 5a is fixedly attached to a stationary support sleeve 42, which coaxially encloses the hollow shaft 10 and extends through the wall of the hub shell 40. The end of the stationary support sleeve 42 that extends through the hub shell 40 attaches to the frame support and preferentially has a non-cylindrical shape to enhance subsequent attachment of a torque lever 43. As shown more clearly in FIG. 7, the torque lever 43 is placed over the non-cylindrical shaped end of the stationary support sleeve 42, and is held in place by a torque nut 44. The torque lever 43 at its other end is rigidly attached to a strong, non-moving part, such as a frame (not shown). A stationary support bearing 48 supports the hub shell 40 and permits the hub shell 40 to rotate relative to the stationary support sleeve 42.

Referring back to FIGS. 1 and 2, shifting is manually activated by axially sliding a rod 11 positioned in the hollow shaft 10. One or more pins 12 are inserted through one or more transverse holes in the rod 11 and further extend through one or more longitudinal slots 16 (not shown) in the hollow shaft 10. The slots 16 in the hollow shaft 10 allow for axial movement of the pin 12 and rod 11 assembly in the hollow shaft 10. As the rod 11 slides axially in the hollow shaft 10, the ends of the transverse pins 12 extend into and couple with a coaxial sleeve 19. The sleeve 19 is fixedly attached at each end to a substantially planar platform 13a, 13b forming a trough around the circumference of the sleeve 19.

As seen more clearly in FIG. 4, the planar platforms 13a, 13b each contact and push multiple wheels 21a–f. The wheels 21a–f fit into slots in the spindle supports 2a–f and are held in place by wheel axles 22a–f. The wheel axles 22a–f are supported at their ends by the spindle supports 2a–f and allow rotational movement of the wheels 21 a–f.

Referring back to FIGS. 1 and 2, the substantially planar platforms 13a, 13b transition into a convex surface at their outer perimeter (farthest from the hollow shaft 10). This region allows slack to be taken up when the spindle supports 2a–f and power adjusters 1a, 1b, 1c are tilted as the transmission 100 is shifted. A cylindrical support member 18 is located in the trough formed between the planar platforms 13a, 13b and sleeve 19 and thus moves in concert with the planar platforms 13a, 13b and sleeve 19. The support member 18 rides on contact bearings 17a, 17b located at the intersection of the planar platforms 13a, 13b and sleeve 19 to allow the support member 18 to freely rotate about the axis of the transmission 100. Thus, the bearings 17a, 17b, support member 18, and sleeve 19 all slide axially with the planar platforms 13a, 13b when the transmission 100 is shifted.

Now referring to FIGS. 3 and 4, stationary support rollers 30a–l are attached in pairs to each spindle leg 2a–f through a roller pin 31a–f and held in place by roller clips 32a–l. The roller pins 31a–f allow the stationary support rollers 30a–l to rotate freely about the roller pins 31a–f. The stationary support rollers 30a–l roll on a concave radius in the stationary support 5a, 5b along a substantially parallel path with the grooves 6a–f. As the spindle rollers 4a–f move back and forth inside the grooves 6a–f, the stationary support rollers 30a–l do not allow the ends of the spindles 3a, 3b, 3c nor the spindle rollers 4a–f to contact the bottom surface of the grooves 6a–f, to maintain the position of the spindles 3a, 3b, 3c, and to minimize any frictional losses.

FIG. 4 shows the stationary support rollers 30a–l, the roller pins, 31a–f, and roller clips 32a–l, as seen through the stationary support 5a, for ease of viewing. For clarity, i.e., too many numbers in FIG. 1, the stationary support rollers 30a–l, the roller pins, 31a–f, and roller clips 32a–l, are not numbered in FIG. 1.

Figure 5:
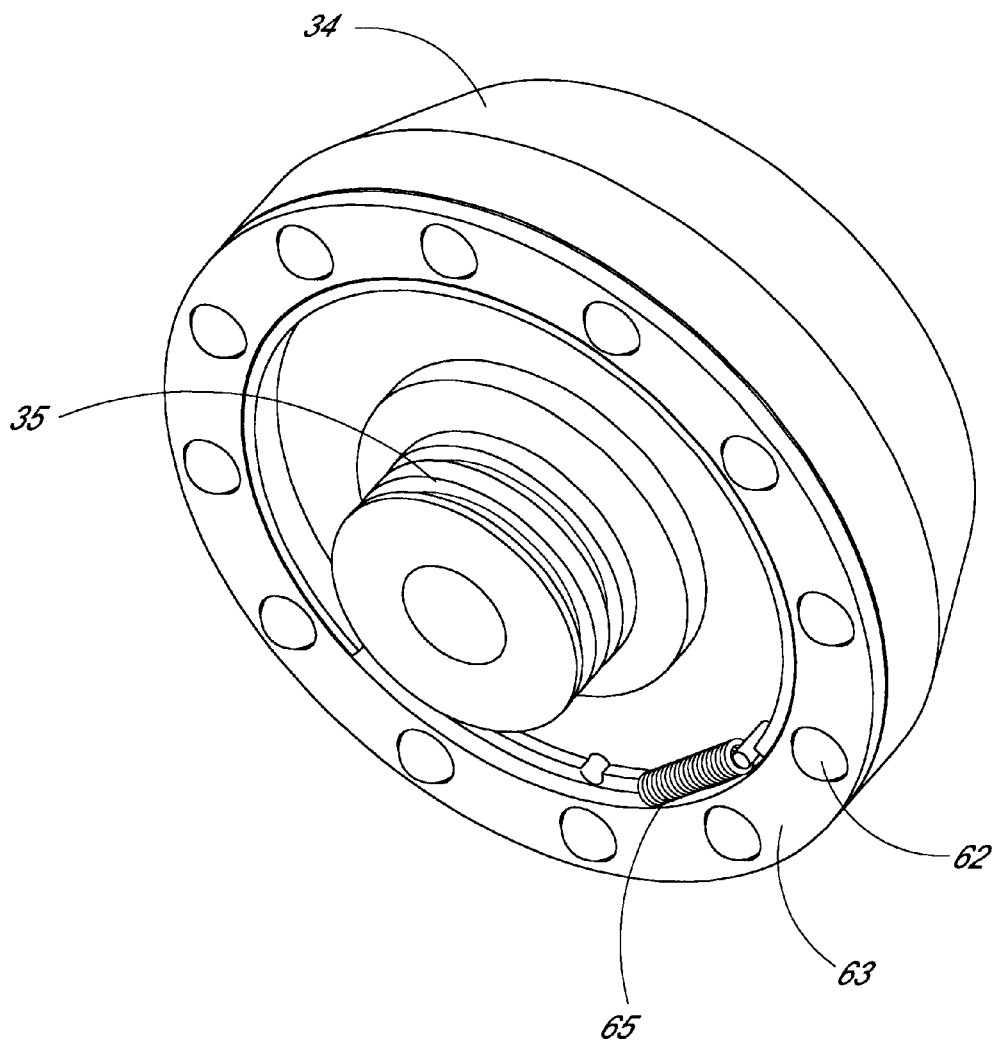
FIG. 5 is a perspective view of a drive disc, bearing cage, screw, and ramp bearings of the transmission of FIG. 1.

Referring to FIGS. 1 and 5, a concave drive disc 34, located adjacent to the stationary support 5b, partially encapsulates but does not contact the stationary support 5b. The drive disc 34 is rigidly attached through its center to a screw 35. The screw 35 is coaxial to and forms a sleeve around the hollow shaft 10 adjacent to the stationary support 5b and faces a driving member 69. The drive disc 34 is rotatively coupled to the power adjusters 1a, 1b, 1c along a circumferential bearing surface on the lip of the drive disc 34. A nut 37 is threaded over the screw 35 and is rigidly attached around its circumference to a bearing disc 60. One face of the nut 37 is further attached to the driving member 69. Also rigidly attached to the bearing disc 60 surface are a plurality of ramps 61 which face the drive disc 34. For each ramp 61 there is one ramp bearing 62 held in position by a bearing cage 63. The ramp bearings 62 contact both the ramps 61 and the drive disc 34. A spring 65 is attached at one end to the bearing cage 63 and at its other end to the drive disc 34, or the bearing disc 60 in an alternate embodiment, to bias the ramp bearings 62 up the ramps 61. The bearing disc 60, on the side opposite the ramps 61 and at approximately the same circumference contacts a hub cap bearing 66. The hub cap bearing 66 contacts both the hub cap 67 and the bearing disc 60 to allow their relative motion. The hub cap 67 is threaded or pressed into the hub shell 40 and secured with an internal ring 68. A sprocket or pulley 38 is rigidly attached to the rotating driving member 69 and is held in place externally by a cone bearing 70 secured by a cone nut 71 and internally by a driver bearing 72 which contacts both the driving member 69 and the hub cap 67.

In operation, an input rotation from the sprocket or pulley 38, which is fixedly attached to the driver 69, rotates the bearing disc 60 and the plurality of ramps 61 causing the ramp bearings 62 to roll up the ramps 61 and press the drive disc 34 against the power adjusters 1a, 1b, 1c. Simultaneously, the nut 37, which has a smaller lead than the ramps 61, rotates to cause the screw 35 and nut 37 to bind. This feature imparts rotation of the drive disc 34 against the power adjusters 1a, 1b, 1c. The power adjusters 1a, 1b, 1c, when rotating, contact and rotate the hub shell 40.

When the transmission 100 is coasting, the sprocket or pulley 38 stops rotating but the hub shell 40 and the power adjusters 1a, 1b, 1c, continue to rotate. This causes the drive disc 34 to rotate so that the screw 35 winds into the nut 37 until the drive disc 34 no longer contacts the power adjusters 1a, 1b, 1c.

Figure 6:
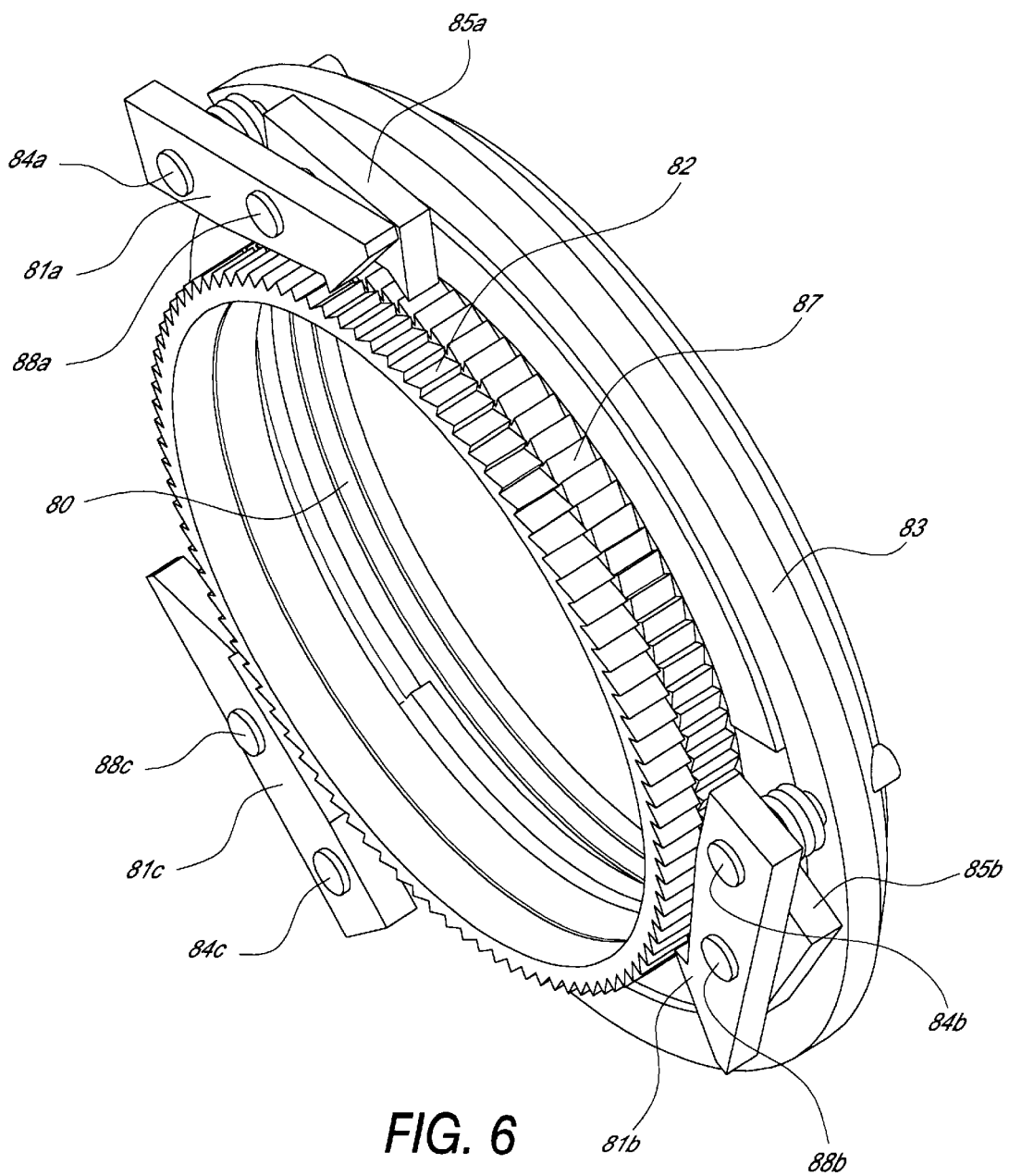
FIG. 6 is a perspective view of a ratchet and pawl subsystem of the transmission of FIG. 1 that is used to engage and disengage the transmission.

Referring to FIGS. 1, 6, and 7, a coiled spring 80, coaxial with the transmission 100, is located between and attached by pins or other fasteners (not shown) to both the bearing disc 60 and drive disc 34 at the ends of the coiled spring 80. During operation of the transmission 100, the coiled spring 80 ensures contact between the power adjusters 1a, 1b, 1c and the drive disc 34. A pawl carrier 83 fits in the coiled spring 80 with its middle coil attached to the pawl carrier 83 by a pin or standard fastener (not shown). Because the pawl carrier 83 is attached to the middle coil of the coiled spring 80, it rotates at half the speed of the drive disc 34 when the bearing disc 60 is not rotating. This allows one or more lock pawls 81a, 81b, 81c, which are attached to the pawl carrier 83 by one or more pins 84a, 84b, 84c, to engage a drive disc ratchet 82, which is coaxial with and rigidly attached to the drive disc 34. The one or more lock pawls 84a, 84b, 84c are preferably spaced asymmetrically around the drive disc ratchet 82. Once engaged, the loaded coiled spring 80 is prevented from forcing the drive disc 34 against the power adjusters 1a, 1b, 1c. Thus, with the drive disc 34 not making contact against the power adjusters 1a, 1b, 1c, the transmission 100 is in neutral and the ease of shifting is increased. The transmission 100 can also be shifted while in operation.

When operation of the transmission 100 is resumed by turning the sprocket or pulley 38, one or more release pawls 85a, 85b, 85c, each attached to one of the lock pawls 81a, 81b, 81c by a pawl pin 88a, 88b, 88c, make contact with an opposing bearing disc ratchet 87. The bearing disc ratchet 87 is coaxial with and rigidly attached to the bearing disc 60. The bearing disc ratchet 87 actuates the release pawls 85a, 85b, 85c because the release pawls 85a, 85b, 85c are connected to the pawl carrier 83 via the lock pawls 81a, 81b, 81c. In operation, the release pawls 85a, 85b, 85c rotate at half the speed of the bearing disc 60, since the drive disc 34 is not rotating, and disengage the lock pawls 81a, 81b, 81c from the drive disc ratchet 82 allowing the coiled spring 80 to wind the drive disc 34 against the power adjusters 1a, 1b, 1c. One or more pawl tensioners (not shown), one for each release pawl 85a, 85b, 85c, ensures that the lock pawls 81a, 81b, 81c are pressed against the drive disc ratchet 82 and that the release pawls 85a, 85b, 85c are pressed against the bearing disc ratchet 87. The pawl tensioners are attached at one end to the pawl carrier 83 and make contact at the other end to the release pawls 85a, 85b, 85c. An assembly hole 93 (not shown) through the hub cap 67, the bearing disc 60, and the drive disc 34, allows an assembly pin (not shown) to be inserted into the loaded coiled spring 80 during assembly of the transmission 100. The assembly pin prevents the coiled spring 80 from losing its tension and is removed after transmission 100 assembly is complete.

Referring to FIGS. 1, 11, 12, and 15, automatic shifting of the transmission 100, is accomplished by means of spindle cables 602, 604, 606 which are attached at one end to a non-moving component of the transmission 100, such as the hollow shaft 10 or the stationary support 5a. The spindle cables 602, 604, 606 then travel around spindle pulleys 630, 632, 634, which are coaxially positioned over the spindles 3a, 3b, 3c. The spindle cables 602, 604, 606 further travel around spacer pulleys 636, 638, 640, 644, 646, 648 which are attached to a spacer extension 642 which may be rigidly attached to the spacers 8a, 8b, 8c. As more clearly shown in FIGS. 11 and 12, the other ends of the spindle cables 602, 604, 606 are attached to a plurality of holes 620, 622, 624 in a non-rotating annular bearing race 816. A plurality of weight cables 532, 534, 536 are attached at one end to a plurality of holes 610, 612, 614 in a rotating annular bearing race 806. An annular bearing 808, positioned between the rotating annular bearing race 806 and the non-rotating annular bearing race 816, allows their relative movement.

Figure 15:
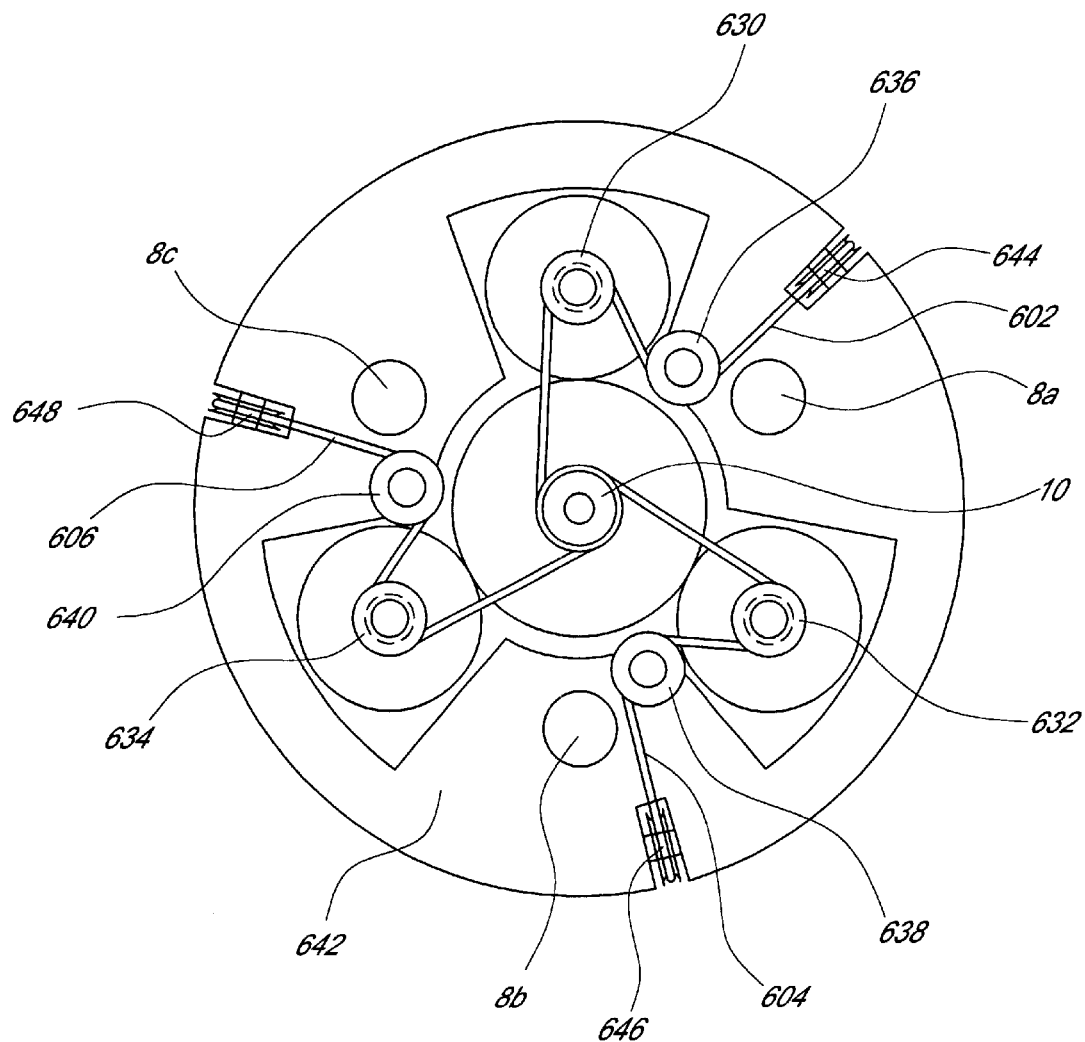
FIG. 15 is a schematic end view of the transmission in FIG. 1 showing the cable routing across a spacer extension of the automatic portion of the transmission.

Referring to FIG. 15, the transmission 100 is shown with the cable routing for automatic shifting.

As shown in FIGS. 1, 9, 11, and 12, the weight cables 532, 534, 536 then travel around the hub shell pulleys 654, 656, 658, through holes in the hub shell 40, and into hollow spokes 504, 506, 508 (best seen in FIG. 12) where they attach to weights 526, 528, 530. The weights 526, 528, 530 are attached to and receive support from weight assisters 516, 518, 520 which attach to a wheel 514 or other rotating object at there opposite end. As the wheel 514 increases its speed of rotation, the weights 526, 528, 530 are pulled radially away from the hub shell 40, pulling the rotating annular bearing race 806 and the non-rotating annular bearing race 816 axially toward the hub cap 67. The non-rotating annular bearing race 816 pulls the spindle cables 602, 604, 606, which pulls the spindle pulleys 630, 632, 634 closer to the hollow shaft 10 and results in the shifting of the transmission 100 into a higher gear. When rotation of the wheel 514 slows, one or more tension members 9 positioned inside the hollow shaft 10 and held in place by a shaft cap 92, push the spindle pulleys 630, 632, 634 farther from the hollow shaft 10 and results in the shifting of the transmission 100 into a lower gear.

Alternatively, or in conjunction with the tension member 9, multiple tension members (not shown) may be attached to the spindles 3a, 3b, 3c opposite the spindle pulleys 630, 632, 634.

Still referring to FIG. 1, the transmission 100 can also be manually shifted to override the automatic shifting mechanism or to use in place of the automatic shifting mechanism. A rotatable shifter 50 has internal threads that thread onto external threads of a shifter screw 52 which is attached over the hollow shaft 10. The shifter 50 has a cap 53 with a hole that fits over the rod 11 that is inserted into the hollow shaft 10. The rod 11 is threaded where it protrudes from the hollow shaft 10 so that nuts 54, 55 may be threaded onto the rod 11. The nuts 54, 55 are positioned on both sides of the cap 53. A shifter lever 56 is rigidly attached to the shifter 50 and provides a moment arm for the rod 11. The shifter cable 51 is attached to the shifter lever 56 through lever slots 57a, 57b, 57c. The multiple lever slots 57a, 57b, 57c provide for variations in speed and ease of shifting.

Figure 10:
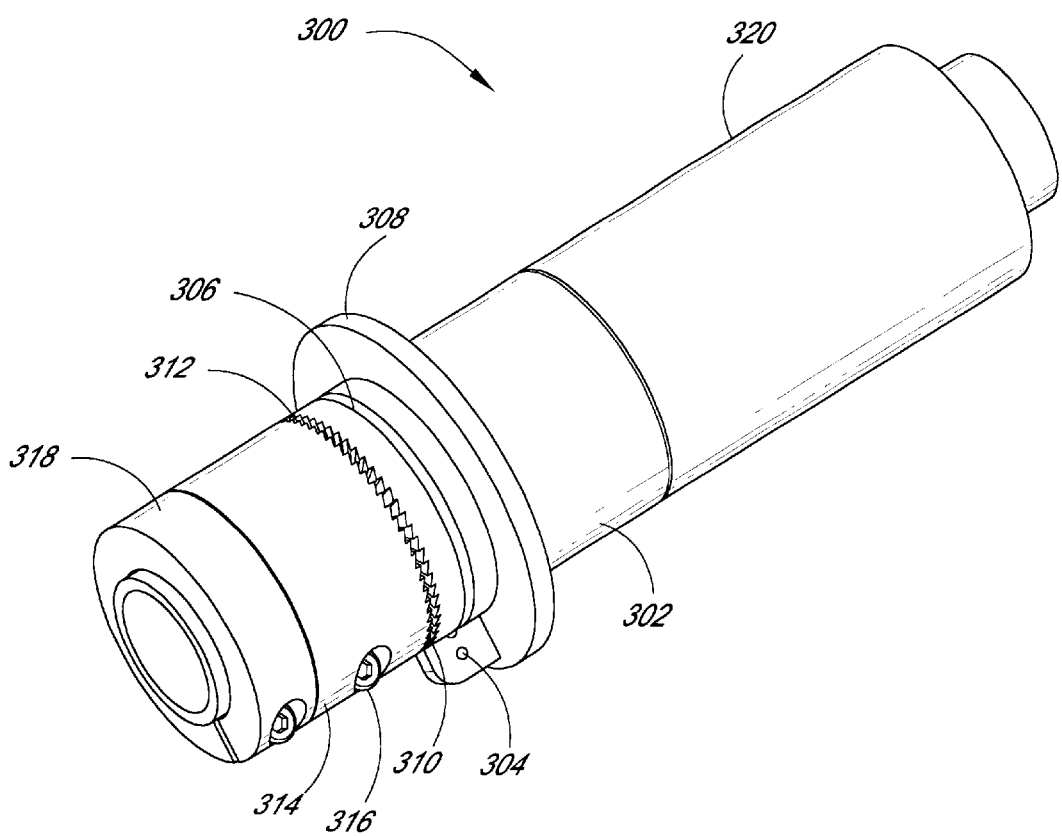
FIG. 10 is a perspective view of the shifting handlegrip that is mechanically coupled to the transmission of FIG. 1.
Figure 11:
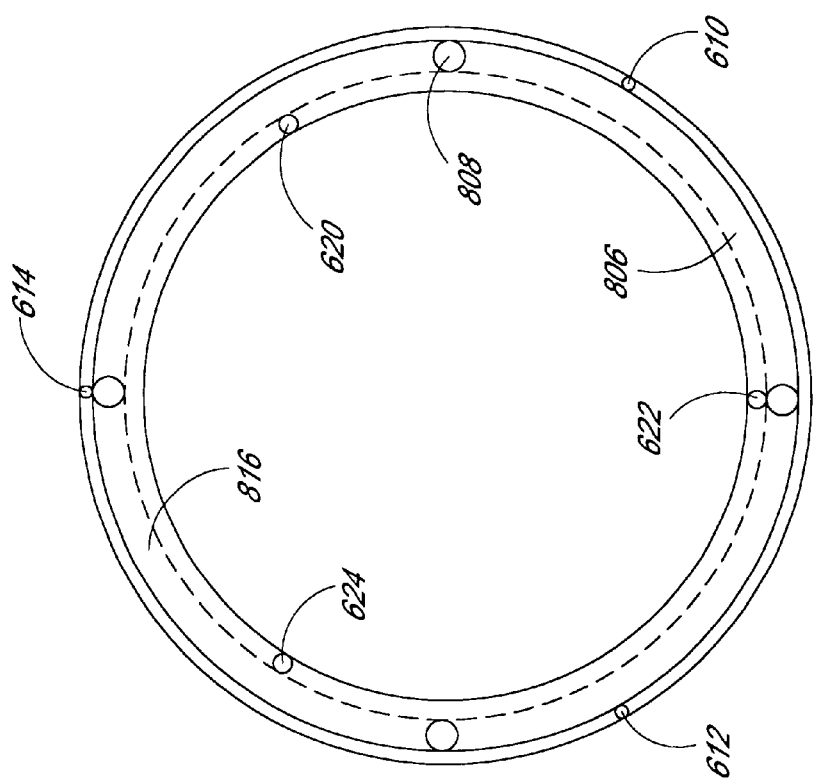
FIG. 11 is an end view of a thrust bearing, of the transmission shown in FIG. 1, which is used for automatic shifting of the transmission.
Figure 12:
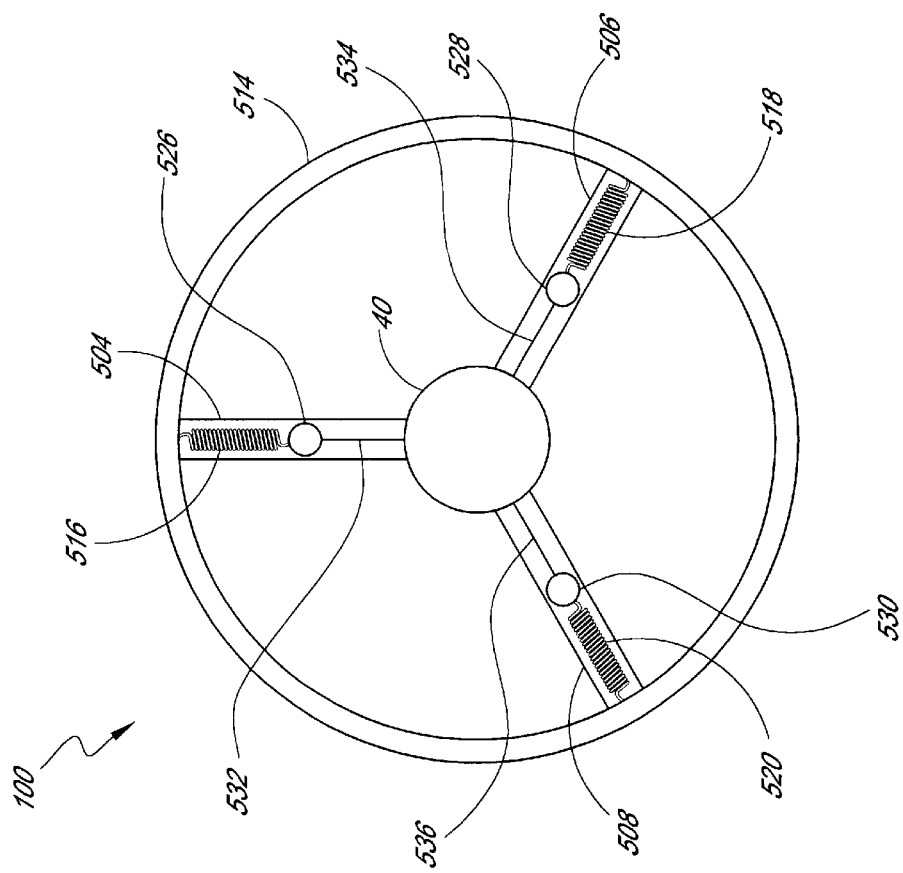
FIG. 12 is an end view of the weight design of the transmission shown in FIG. 1.

Now referring to FIGS. 1 and 10, the shifter cable 51 is routed to and coaxially wraps around a handlegrip 300. When the handlegrip 300 is rotated in a first direction, the shifter 50 winds or unwinds axially over the hollow shaft 10 and pushes or pulls the rod 11 into or out of the hollow shaft 10. When the handlegrip 300 is rotated in a second direction, a shifter spring 58, coaxially positioned over the shifter 50, returns the shifter 50 to its original position. The ends of the shifter spring 58 are attached to the shifter 50 and to a non-moving component, such as a frame (not shown).

As seen more clearly in FIG. 10, the handlegrip 300 is positioned over a handlebar (not shown) or other rigid component. The handlegrip 300 includes a rotating grip 302, which consists of a cable attachment 304 that provides for attachment of the shifter cable 51 and a groove 306 that allows the shifter cable 51 to wrap around the rotating grip 302. A flange 308 is also provided to preclude a user from interfering with the routing of the shifter cable 51. Grip ratchet teeth 310 are located on the rotating grip 302 at its interface with a rotating clamp 314. The grip ratchet teeth 310 lock onto an opposing set of clamp ratchet teeth 312 when the rotating grip 302 is rotated in a first direction. The clamp ratchet teeth 312 form a ring and are attached to the rotating clamp 314 which rotates with the rotating grip 302 when the grip ratchet teeth 310 and the clamp ratchet teeth 312 are locked. The force required to rotate the rotating clamp 314 can be adjusted with a set screw 316 or other fastener. When the rotating grip 302, is rotated in a second direction, the grip ratchet teeth 310, and the clamp ratchet teeth 312 disengage. Referring back to FIG. 1, the tension of the shifter spring 58 increases when the rotating grip 302 is rotated in the second direction. A non-rotating clamp 318 and a non-rotating grip 320 prevent excessive axial movement of the handlegrip 300 assembly.

Figure 13:
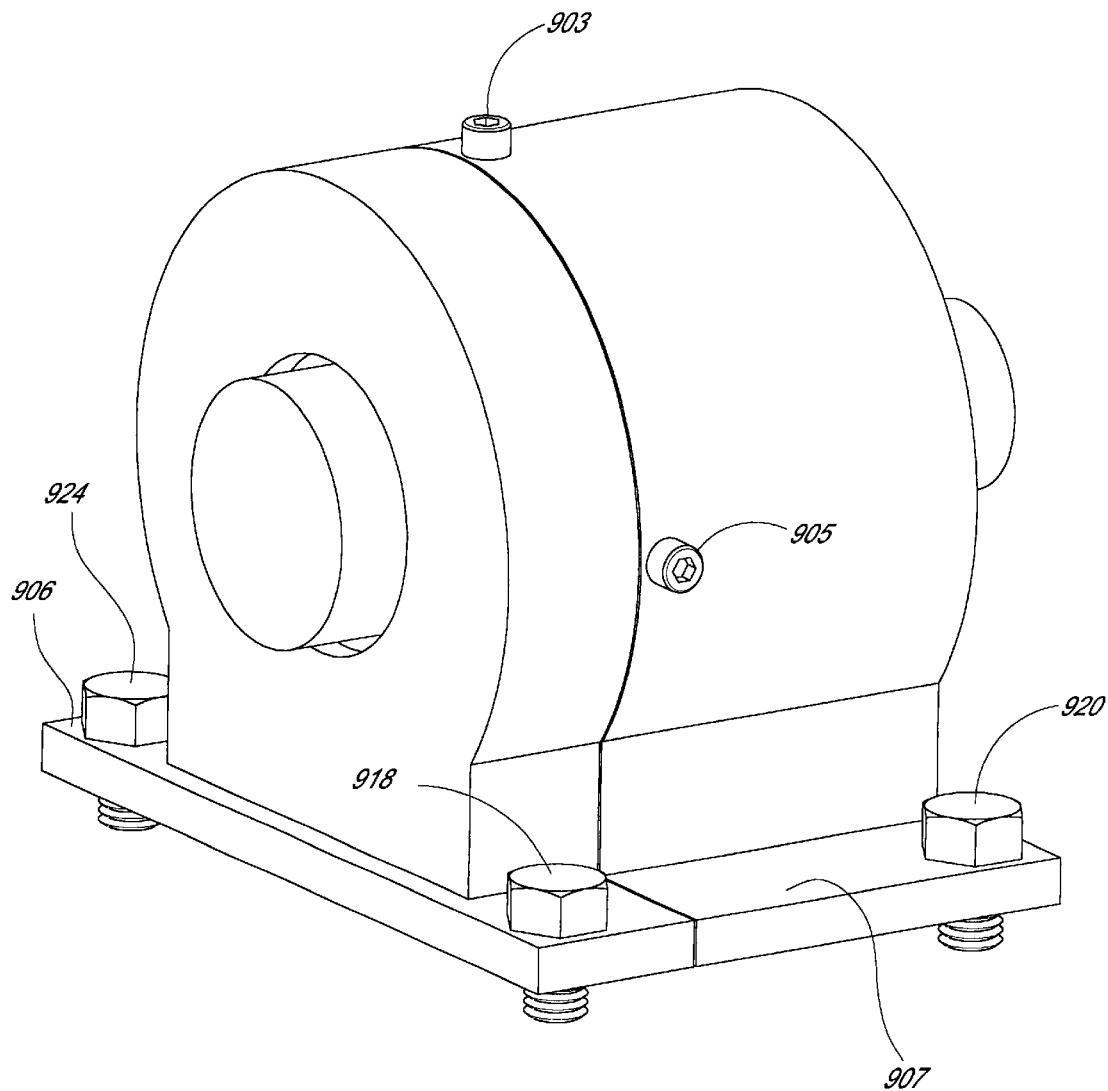
FIG. 13 is a perspective view of an alternate embodiment of the transmission bolted to a flat surface.
Figure 14:
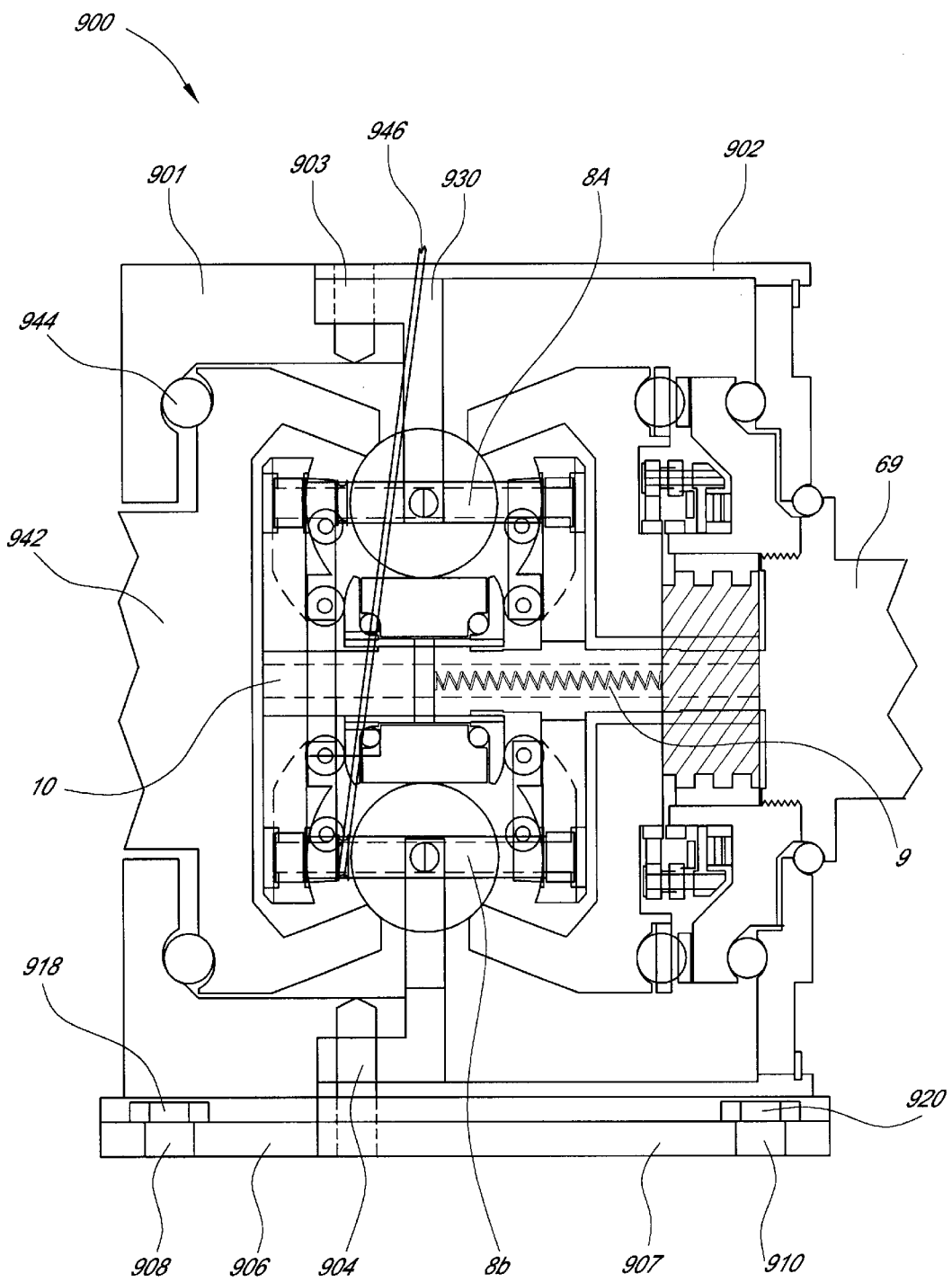
FIG. 14 is a cutaway side view of the transmission shown in FIG. 13.

Referring to FIGS. 13 and 14, another embodiment of the transmission 900, is disclosed. For purposes of simplicity, only the differences between the transmission 100 and the transmission 900 are discussed.

Replacing the rotating hub shell 40 are a stationary case 901 and housing 902, which are joined with one or more set screws 903, 904, 905. The set screws 903, 904, 905 may be removed to allow access for repairs to the transmission 900. Both the case 901 and housing 902 have coplanar flanges 906, 907 with a plurality of bolt holes 908, 910, 912, 914 for insertion of a plurality of bolts 918, 920, 922, 924 to fixedly mount the transmission 900 to a non-moving component, such as a frame (not shown).

The spacer extension 930 is compressed between the stationary case 901 and housing 902 with the set screws 903, 904, 905 and extend towards and are rigidly attached to the spacers 8a, 8b, 8c. The spacer extension 930 prevents rotation of the stationary supports 5a, 5b. The stationary support 5a does not have the stationary support sleeve 42 as in the transmission 100. The stationary supports 5a, 5b hold the hollow shaft 10 in a fixed position. The hollow shaft 10 terminates at one end at the stationary support 5a and at its other end at the screw 35. An output drive disc 942 is added and is supported against the case 901 by a case bearing 944. The output drive disc 942 is attached to an output drive component, such as a drive shaft, gear, sprocket, or pulley (not shown). Similarly, the driving member 69 is attached to the input drive component, such as a motor, gear, sprocket, or pulley.

Figure 16:
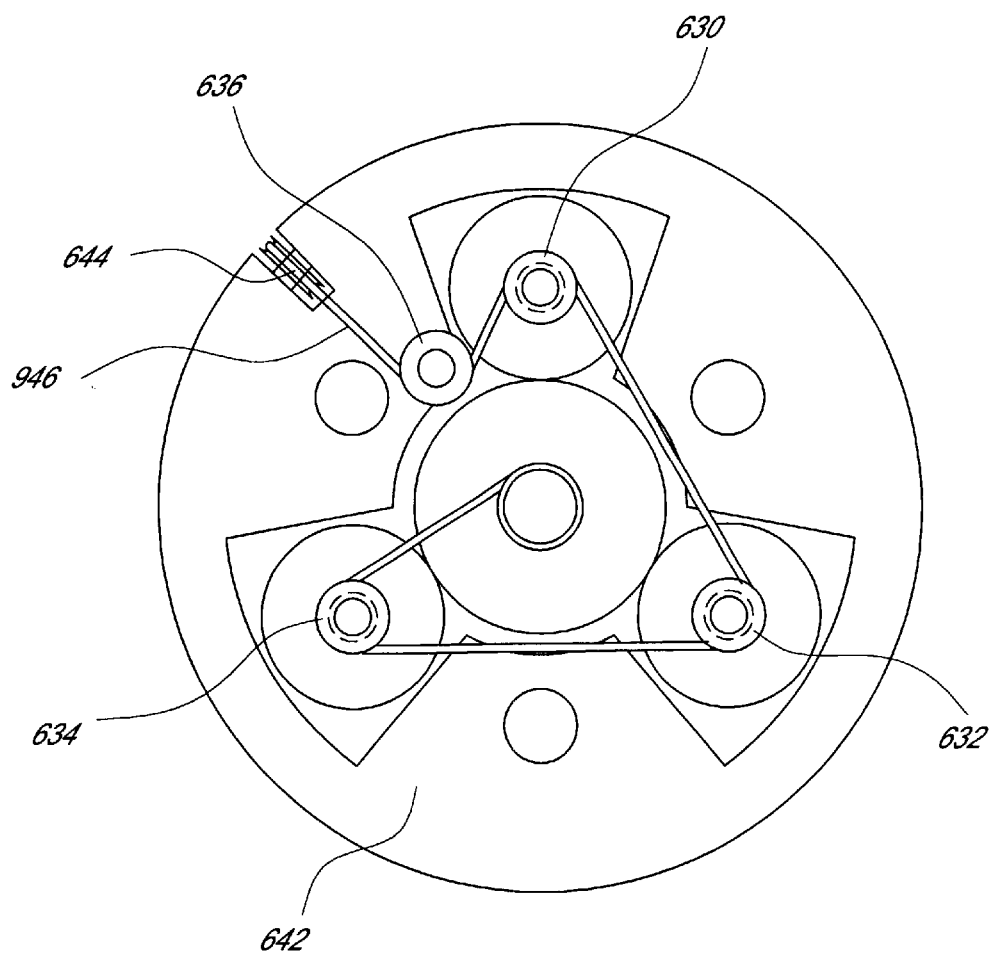
FIG. 16 is a schematic end view of the cable routing of the transmission shown in FIG. 13.

Referring to FIG. 16, shifting of the transmission 900 is accomplished with a single cable 946 that wraps around each of the spindle pulleys 630, 632, 634. At one end, the single cable 946 is attached to a non-moving component of the transmission 900, such as the hollow shaft 10 or the stationary support 5*a*. After traveling around each of the spindle pulleys 630, 632, 634 and the spacer pulleys 636, 644, the single cable 946 exits the transmission 900 through a hole in the housing 902. Alternatively a rod (not shown) attached to one or more of the spindles 3*a*, 3*b*, 3*c*, may be used to shift the transmission 900 in place of the single cable 946.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A continuously variable transmission having a longitudinal axis, comprising:

a plurality of spherical power adjusters, wherein each power adjuster has at least one central bore that is centrally located within the power adjuster and that defines an axis of rotation of the power adjuster;

a drive disc annularly rotatable about the longitudinal axis and contacting a first point on each of the power adjusters and having a first side facing the power adjusters and a second side facing away from the power adjusters;

a plurality of generally elongated spindles having two ends and a longitudinal axis, wherein each spindle is positioned in the bore of one of the power adjusters;

a plurality of spindle supports having a platform end and spindle end, wherein two spindle supports are provided for each spindle, and wherein the spindle end of each spindle support is operably engaged with one of the two ends of one of the plurality of spindles;

a support member providing a support surface that is in frictional contact with a second point on each of the power adjusters, wherein the support member rotates coaxially about the longitudinal axis, is centrally located between the power adjusters, and has two ends;

an output drive disc annularly rotatable about the longitudinal axis that contacts a third point on the power adjusters;

a stationary case at least partially enclosing the transmission;

two platforms, one located axially adjacent to each end of the support member, for actuating axial movement of the support member and for actuating a shift in the axis of rotation of the power adjusters, wherein each platform provides a convex surface that is operably engaged with the platform ends of the plurality of spindle supports;

annular first and second stationary supports each having a first side facing the power adjusters and a second side facing away from the power adjusters, each of the first and second stationary supports also having a concave surface on the first side, and wherein the first stationary support is located adjacent to the drive disc and the second stationary support is located adjacent to the output drive disc;

a plurality of spacers having a longitudinal axis and two ends, wherein the spacers are adapted to interconnect the stationary supports thereby maintaining an orientation of the first stationary support with respect to the second stationary support, and;

at least one generally annular spacer extension attached to at least one of the plurality of spacers and located between the first and second stationary supports.

2. The transmission of claim 1, further comprising a plurality of flexible tension member guides, wherein at least one flexible tension member guide is positioned coaxially over each spindle and adapted to adjust the axis or rotation of the power adjusters.

3. The transmission of claim 2, further comprising at least one flexible tension member adapted to apply a force to at least one of the spindles to adjust the axes of rotation of at least one of the power adjusters.

4. The transmission of claim 3, wherein the at least one flexible tension member is guided by the at least one flexible tension member guide.

5. The transmission of claim 4, wherein the at least one flexible tension member terminates at an end outside of the stationary case.

6. The transmission of claim 4, wherein the at least one flexible tension member is guided by all of the flexible tension member guides that are positioned coaxially over the plurality of spindles.

7. The transmission of claim 1, further comprising at least one flexible tension member guide, wherein each of the at least one flexible tension member guide is positioned coaxially over one of the plurality of spindles and adapted to adjust the axis of the one spindle.

8. The transmission of claim 7, further comprising at least one flexible tension member, wherein each of the at least one flexible tension member is guided by one of the at least one flexible tension member guides.

9. The transmission of claim 1, wherein the at least one spacer extension is attached to a non-moving component and is positioned radially outward from the spacers.

10. The transmission of claim 9, wherein the at least one spacer extension is attached to the stationary case.

11. The transmission of claim 1, further comprising a return spring, wherein the return spring is adapted to bias the shifting of the transmission toward a low transmission ratio.

12. The transmission of claim 11, wherein the return spring is positioned on a side of the power adjusters that faces the drive disc.

13. The transmission of claim 1, further comprising a return spring, wherein the return spring adapted to bias the shifting of the transmission toward a high transmission ratio.

14. The transmission of claim 1, further comprising an annular case bearing wherein the case bearing is located between the stationary case and the output drive disc.

15. The transmission of claim 1, wherein each of the spacers is positioned such that the axis of each spacer is equidistant from the axes of rotation of at least two of the power adjusters.

16. The transmission of claim 1, wherein the at least one spacer extension is adapted to prevent the first and second stationary supports from rotating.

17. The transmission of claim 16, wherein the at least one spacer extension further substantially comprises an annular disc having an outer diameter larger than a diameter formed by the first points of contact of the power adjusters, and at least one having leg each of which extend radially inward between two adjacent power adjusters and rigidly attach to one of the spacers.

18. The transmission of claim 3, further comprising at least one flexible tension member guide positioned separate from the spindles adapted to guide the at least one flexible tension member to a termination point outside of the transmission.

19. The transmission of claim 7, further comprising at least one flexible tension member guide positioned separate from the spindles adapted to guide the at least one flexible tension member to a termination point outside of the transmission.

20. The transmission of claim 7, wherein the flexible tension member guides are located between the power adjusters and the rotatable output drive disc.

21. The transmission of claim 7, wherein the flexible tension member guides are located between the power adjusters and the rotatable driving member.

22. The transmission of claim 1, wherein the stationary case is operably attached to at least one stationary support.

23. The transmission of claim 7, wherein the plurality of spindles is operably connected to at least one flexible tension member extending radially away from the longitudinal axis and through the stationary case.

24. The transmission of claim 7, wherein movement of the at least one flexible tension member guide causes axially movement of the platforms.

25. The transmission of claim 24, wherein axial movement of the platforms causes axial movement of the support member.

26. The transmission of claim 1, further comprising:
    an annular case bearing wherein the case bearing is located between the stationary case and the output drive disc;
    a bearing disc annularly rotatable about the longitudinal axis, and positioned axially adjacent to the second side of the drive disc;
    a set of ramps attached to the bearing disc adapted to produce an axial force that is transferred to the drive disc;
    a set of generally annular ramp bearings contacting the ramps and positioned between the bearing disc and the drive disc, wherein the set of ramp bearings is adapted to transfer an axial force to the drive disc;
    an annular hub cap adapted to engage the stationary case to at least partially enclose the transmission; and
    an annular hub cap bearing located between the bearing disc and the hub cap adapted to allow for relative motion between the bearing disc and the hub cap.

27. The transmission of claim 26, wherein an axial force is generated that is adapted to prevent the power adjusters from slipping in at least one transmission ratio, wherein the axial force is applied to the drive disc and is supported by the stationary case via the hub cap bearing and the case bearing.

28. The transmission of claim 1, further comprising a screw and a nut, wherein the screw and nut allow disengagement of the transmission.

29. The transmission of claim 1, further comprising a screw attached to an inner bore of the drive disc and a nut, which is attached to an inner bore of the bearing disc and is adapted to engage the screw, wherein the screw and the nut provide axial force to the drive disc.

30. The transmission of claim 29, further comprising;
    a bearing disc annularly rotatable about the longitudinal axis, and positioned axially adjacent to the second side of the drive disc;
    a set of ramps attached to the bearing disc adapted to produce an axial force that is transferred to the drive disc; and
    a set of generally annular ramp bearings contacting the ramps and positioned between the bearing disc and the drive disc, wherein the set of ramp bearings is adapted to transfer an axial force to the drive disc when the screw and nut are not providing axial force to the drive disc.

31. The transmission of claim 29, further comprising;
    a bearing disc annularly rotatable about the longitudinal axis, and positioned axially adjacent to the second side of the drive disc;
    a set of ramps attached to the bearing disc adapted to produce an axial force that is transferred to the drive disc; and
    a set of generally annular ramp bearings contacting the ramps and positioned between the bearing disc and the drive disc, wherein the set of ramp bearings is adapted to transfer an axial force to the drive disc in conjunction with the screw and nut in order to vary the axial force to the drive disc.

32. The transmission of claim 1, further comprising a screw attached to an inner bore of the drive disc and a nut, which is attached to an inner bore of the bearing disc and is adapted to engage the screw, wherein the screw and the nut have a left-hand thread if the screw and nut are rotated clockwise from a perspective looking from the bearing disc toward the power adjusters.

33. A continuously variable transmission having a longitudinal axis comprising:
    a plurality of spherical power adjusters, wherein each power adjuster has at least one central bore that is centrally located within the power adjuster and that defines an axis of rotation of the power adjuster;
    a drive disc annularly rotatable about the longitudinal axis and contacting a first point on each of the power adjusters and having a first side facing the power adjusters and a second side facing away from the power adjusters;
    a support member providing a support surface that is in frictional contact with a second point on each of the power adjusters, wherein the support member rotates coaxially about the longitudinal axis, is centrally located between the power adjusters and has two ends;
    a plurality of generally elongated spindles having two ends and a longitudinal axis, wherein each spindle is positioned in the bore of one of the power adjusters;
    a plurality of spindle supports having a platform end and spindle end, wherein two spindle supports are provided for each spindle, wherein the spindle end of each spindle support is operably engaged with one of the two ends of one of the plurality of spindles, and wherein each of the spindle supports adjusts the axis of rotation of a power adjuster in response to the axial movement of the support member.
    two platforms, one located axially adjacent to each end of the support member, for actuating axial movement of the support member and for actuating a shift in the axis of rotation of the power adjusters, wherein each platform provides a convex surface that is operably engaged with the platform ends of the plurality of spindle supports;

first and second annular contact bearings, each positioned between a respective one of the first and second platform and a corresponding end of the support member;

annular first and second stationary supports each having a first side facing the power adjusters and a second side facing away from the power adjusters, each of the first and second stationary supports also having a concave surface on the first side, and wherein the first stationary support is located adjacent to the drive disc and the second stationary support is located adjacent to the output drive disc; and a plurality of spacers having a longitudinal axis and two ends, wherein the spacers are adapted to interconnect the stationary supports thereby maintaining an orientation of the first stationary support with respect to the second stationary support.

34. The transmission of claim 33, further comprising a tension member adapted to bias the shifting of the transmission toward a low transmission ratio.

35. The transmission of claim 34, wherein the tension member is positioned axially on a side of the power adjusters that is adjacent to the drive disc.

36. The transmission of claim 33, further comprising a tension member adapted to bias the shifting of the transmission toward a high transmission ratio.

37. The transmission of claim 33, each of the spacers is positioned such that the axis of each spacer is equidistant from the axes of rotation of at least two of the power adjusters.

38. The transmission of claim 33, wherein axial movement of the platforms causes axial movement of the support member.

39. The transmission of claim 33, further comprising:

a bearing disc annularly rotatable about the longitudinal axis, and positioned axially adjacent to the second side of the drive disc;

a set of ramps attached to the bearing disc adapted to produce an axial force that is transferred to the drive disc;

a set of generally annular ramp bearings contacting the ramps and positioned between the bearing disc and the drive disc, wherein the set of ramp bearings is adapted to transfer an axial force to the drive disc;

a hub shell adapted to at least partially enclose the transmission;

an annular hub cap adapted to engage the hub shell and adapted to at least partially enclose the transmission; and an annular hub cap bearing located between the bearing disc and the hub cap adapted to allow for relative motion between the bearing disc and the hub cap.

40. The transmission of claim 39, wherein an axial force is generated that is adapted to prevent the power adjusters from slipping in at least one transmission ratio, wherein the axial force is applied to the drive disc and is supported by the hub shell via the hub cap and the hub cap bearing.

41. The transmission of claim 33, further comprising a screw attached to an inner bore of the drive disc and a nut, which is attached to an inner bore of the bearing disc and is adapted to engage the screw, wherein the screw and the nut are adapted to allow disengagement of the transmission.

42. The transmission of claim 33, further comprising a screw attached to an inner bore of the drive disc and a nut, which is attached to an inner bore of the bearing disc and is adapted to engage the screw, wherein the screw and the nut provide axial force to the drive disc.

43. The transmission of claim 42, further comprising:

a bearing disc annularly rotatable about the longitudinal axis, and positioned axially adjacent to the second side of the drive disc;

a set of ramps attached to the bearing disc adapted to produce an axial force that is transferred to the drive disc;

a set of generally annular ramp bearings contacting the ramps and positioned between the bearing disc and the drive disc, wherein the set of ramp bearings is adapted to transmit an axial force to the drive disc when the screw and nut are not providing an axial force to the drive disc.

44. The transmission of claim 42, further comprising;

a bearing disc annularly rotatable about the longitudinal axis, and positioned axially adjacent to the second side of the drive disc;

a set of ramps attached to the bearing disc adapted to produce an axial force that is transferred to the drive disc;

a set of generally annular ramp bearings contacting the ramps and positioned between the bearing disc and the drive disc, wherein the set of ramp bearings is adapted to transmit an axial force to the drive disc in conjunction with the screw and the nut in order to vary the axial force to the drive disc.

45. The transmission of claim 33, further comprising a screw attached to an inner bore of the drive disc and a nut, which is attached to an inner bore of the bearing disc and is adapted to engage the screw, wherein the screw and the nut have left-hand threads if the screw and nut are rotated clockwise, from a perspective looking from the bearing disc toward the power adjusters.

46. A continuously variable transmission having a longitudinal axis, comprising;

a plurality of power adjusters, wherein each power adjuster has a tiltable axis of rotation, and each power adjuster is located radially outward from the longitudinal axis;

a generally annular drive disc rotatable about the longitudinal axis and contacting a first point on each of the power adjusters, and having a first side contacting the power adjusters and a second side facing away from the power adjusters;

a generally cylindrical support member coaxial with and rotatable about the longitudinal axis and contacting a second point on each power adjuster;

a generally annular output drive disc coaxial with and rotatable about the longitudinal axis and contacting a third point on each power adjuster;

a bearing disc annularly rotatable about the longitudinal axis, and positioned along the longitudinal axis near the second side of the drive disc; and at least two axial force generators, wherein the axial force generators are located axially between the drive disc and the bearing disc, and wherein each axial force generator is adapted to apply a component of an axial force to the drive disc.

47. The transmission of claim 46, wherein the component of the axial force produced by each of the at least two axial force generators varies as the transmission is shifted.

48. The transmission of claim 46, wherein one of the at least two axial force generators is comprised of a screw attached to an inner bore of the drive disc and a nut that is attached to an inner bore of the bearing disc and is adapted to engage the screw.

49. The transmission of claim 48, wherein the threads on the screw and the nut have a gap to allow for axial movement with respect to one another without rotation.

50. The transmission of claim 46, wherein one of the at least two axial force generators is a set of ramps attached to the bearing disc, wherein the set of ramps is adapted to produce an axial force.

51. The transmission of claim 46, wherein the at least two axial force generators produce more axial force in a high transmission ratio than in a low transmission ratio for a corresponding change in transmission ratio.

52. The transmission of claim 46, wherein the at least two axial force generators produce more axial force in a low transmission ratio than in a high transmission ratio for a corresponding change in transmission ratio.

53. The transmission of claim 46, wherein the at least two axial force generators share production of axial force to the drive disc in a high transmission ratio.

54. The transmission of claim 46, wherein the at least two axial force generators produce axial force separately, and wherein one of the at least two axial force generators produces all of the axial force applied to the drive disc in a high transmission ratio, and another of the at least two axial force generators produces all of the axial force applied to the drive disc in a low transmission ratio.

55. The transmission of claim 48, wherein the screw provides all of the axial force to the drive disc in a low transmission ratio.

56. The transmission of claim 50, wherein the ramps produce all of the axial force to the drive disc in a high transmission ratio.

57. The transmission of claim 48, wherein the screw provides all of the axial force to the drive disc in a high transmission ratio.

58. The transmission of claim 50, wherein the ramps produce all of the axial force to the drive disc in a low transmission ratio.

59. A continuously variable transmission having a longitudinal axis, comprising;
   a plurality of power adjusters, wherein each power adjuster has a tiltable axis of rotation, and each power adjuster is located radially outward from the longitudinal axis;
   a generally annular drive disc rotatable about the longitudinal axis and contacting a first point on each of the power adjusters, and having a first side contacting the power adjusters and a second side facing away from the power adjusters;
   a generally cylindrical support member coaxial with and rotatable about the longitudinal axis and contacting a second point on each power adjuster;
   a generally annular output drive disc coaxial with and rotatable about the longitudinal axis and contacting a third point on each power adjuster;
   a bearing disc annularly rotatable about the longitudinal axis, and positioned along the longitudinal axis near the second side of the drive disc;
   disengagement means positioned between the bearing disc and the drive disc and adapted to disconnect the drive disc from the power adjusters when an input rotational force is ceased.

60. The transmission of claim 59, wherein the disengagement means further comprises at least one toothed wheel and at least one pawl for preventing the drive disc from being rotated to contact the power adjusters until input rotational force is resumed.

61. The transmission of claim 60, wherein the disengagement means further comprises at least two pawls for preventing the drive disc from being rotated to contact the power adjusters until input rotational force is resumed.

62. The transmission of claim 59, wherein the disengagement means further comprises a screw attached to an inner bore of the drive disc and a nut that is attached to an inner bore of the bearing disc and is adapted to engage the screw, wherein the screw and the nut are adapted to disengage the drive disc from the power adjusters when the output drive disc is rotating and the input rotational force has ceased.

63. The transmission of claim 60, wherein the disengagement means further comprises a coiled spring adapted to bias the drive disc to contact the power adjusters.

64. The transmission of claim 63, wherein the coiled spring has a first end operably attached to the bearing disc and a second end operably attached to the drive disc.

65. The transmission of claim 64, wherein the at least one toothed wheel and at least one toothed pawl are adapted to prevent the drive disc from rotating when the input rotational force has ceased, and wherein the coiled spring is adapted to disengage the pawl and the toothed wheel upon resumption of input rotational force and further adapted to then bias the drive disc against the power adjusters.

66. The transmission of claim 65, wherein the coiled spring has a cross-section that is substantially rectangular.

67. The transmission of claim 66, wherein the coiled spring cross-section has four 90 degree corners.

68. The transmission of claim 59, further comprising a coiled spring, wherein an input rotation into the transmission causes the coiled spring to bias the drive disc to contact the power adjusters.

69. The transmission of claim 62, wherein the screw and the nut have left hand threads if the transmission is rotated clockwise, from a perspective looking toward the power adjusters from the bearing disc.

70. The transmission of claim 62, wherein the screw and the nut have right hand threads if the transmission is rotated counter-clockwise, from a perspective looking toward the power adjusters from the bearing disc.

71. The transmission of claim 62, wherein the screw is adapted to produce an axial force that is applied to the drive disc.

72. The transmission of claim 59, further comprising an input means for providing input rotational force into the transmission, and wherein resumed rotation by the input means causes the drive disc to contact the power adjusters.

73. The transmission of claim 62, wherein the nut is operably responsive to the power adjusters and is adapted to be rotated by the power adjusters to disengage the drive disc from the power adjusters.

74. The transmission of claim 73, wherein the nut moves axially away from the power adjusters when the drive disc disengages from the power adjusters.

75. The transmission of claim 73, wherein the nut is rotated clockwise by the power adjusters to disengage the drive disc from the power adjusters if the transmission input rotation is clockwise.

76. The transmission of claim 73, wherein the nut is rotated counter-clockwise by the power adjusters to disengage the drive disc from the power adjusters if the transmission input rotation is counter-clockwise.

77. A continuously variable transmission having a longitudinal axis, comprising;

a plurality of power adjusters, wherein each havs a tiltable axis of rotation, and each power adjuster is located radially outward from the longitudinal axis;

a generally annular drive disc rotatable about the longitudinal axis and contacting a first point on each of the power adjusters, and having a first side contacting the power adjusters and a second side facing away from the power adjusters;

a generally annular output drive disc coaxial with and rotatable about the longitudinal axis and contacting a second point on each power adjuster;

a bearing disc annularly rotatable about the longitudinal axis, and positioned along the longitudinal axis near the second side of the drive disc;

a generally cylindrical support member annularly rotatable about and coaxial with the longitudinal axis and contacting a third point on each of the power adjusters, wherein the support member is adapted to pull toward the drive disc when it is rotating more slowly than the output drive disc and pull toward the output drive disc when it is rotating more slowly than the drive disc.

78. The transmission of claim 77, wherein the support member is adapted to pull toward a relatively higher transmission ratio when it is closer to a side of the power adjusters that faces the drive disc.

79. The transmission of claim 77, wherein the support member is adapted to pull toward a relatively lower transmission ratio when it is closer to a side of the power adjusters that faces the output drive disc.

80. The transmission of claim 77, wherein the support member is adapted to pull toward a relatively lower transmission ratio when it passes a 1:1 transmission ratio and moves axially toward low.

81. The transmission of claim 77, wherein the support member is adapted to pull toward a relatively higher transmission ratio when it passes a 1:1 transmission ratio and moves axially toward high.

82. A continuously variable transmission having a longitudinal axis, comprising;

a plurality of spherical power adjusters, wherein each has a tiltable axis of rotation and a bore through its center, and wherein each power adjuster is located radially outward from the longitudinal axis;

a generally annular drive disc rotatable about the longitudinal axis and contacting a first point on each of the power adjusters;

a generally annular output drive disc rotatable about the longitudinal axis and contacting a second point on each of the power adjusters;

a generally cylindrical support member annularly rotatable about and coaxial with the longitudinal axis and contacting a third point on each of the power adjusters;

a plurality of generally elongated spindles having two ends and a longitudinal axis, wherein each spindle is positioned in the bore of one of the power adjusters such that a movement of the axis of the spindle changes the axis of rotation of an associated power adjuster;

a plurality of spindle supports each having a platform end and a spindle end, wherein the spindle end of each spindle support is operably engaged with one of the two ends of one of the plurality of spindles, and wherein each of the spindle supports adjusts the axis of rotation of a power adjuster in response to the axial movement of the support member;

a plurality of stationary support wheels, wherein at least one stationary support wheel is operably attached to each spindle support, and wherein the stationary support wheels are adapted to guide the spindle support as the spindle support adjusts the axis of rotation of the poser adjusters; and annular first and second stationary supports each having a first side facing the power adjusters and a second side facing away from the power adjusters, each of the first and second stationary supports also having a concave surface on the first side, and wherein the first stationary support is located adjacent to the drive disc and the second stationary support is located adjacent to the output drive disc.

83. The transmission of claim 82, wherein the concave surfaces of the first and second stationary supports are concentric with the centers of all of the power adjusters.

84. The transmission of claim 82, further comprising a face positioned radially inward from the concave surface of each stationary support, wherein the face is adapted to limit the transmission ratio of the transmission.

85. The transmission of claim 82, further comprising radial grooves in the stationary supports, wherein one groove is provided on both concave surfaces for each power adjuster, and wherein each stationary support wheel contacts and rolls on the concave surface of the stationary supports adjacent to the groove corresponding to its associated power adjuster.

86. The transmission of claim 82, further comprising a plurality of spindle rollers, wherein each of the spindle rollers is positioned coaxially over the end of one of the spindles that extends past the spindle supports and into the grooves of a stationary support, and wherein the spindle rollers rollingly engage the grooves to guide the movement of the ends of the spindles as the transmission is shifted.

87. The transmission of claim 86, wherein each of the grooves further comprises first and second vertical sides, wherein each of the plurality of spindle rollers that is configured to rollingly engage an associated groove of the first stationary support engages the first vertical side of the grooves in relatively high transmission ratios and engages the second vertical side of the groove in relatively low transmission ratios.

88. The transmission of claim 86, wherein each of the grooves further comprises first and second vertical sides, wherein each of the plurality of spindle rollers that is configured to rollingly engage an associated groove of the second stationary support engages the second vertical side of the associated groove in relatively high transmission ratios, and engages the first vertical side of the associated groove in relatively low transmission ratios.

89. The transmission of claim 82, further comprising a plurality of spacers having a longitudinal axis and two ends, wherein the spacers are adapted to interconnect the stationary supports thereby maintaining an orientation of the first stationary support with respect to the second stationary support.

90. The transmission of claim 89, further comprising a plurality of holes in each of the stationary supports, wherein each of the holes is adapted to accept insertion of one of the two ends of the spacers.

91. The transmission of claim 90, wherein the holes are substantially curved and the spacers are adapted to be inserted into the holes.

92. The transmission of claim 89, wherein the spacers are positioned such that the axis of each spacer is equidistant from the axes of rotation of at least two power adjusters.

93. The transmission of claim 82, further comprising;

a plurality of platform wheels rotatably attached to the platform end of the spindle supports;

first and second platforms, which are generally annular discs coaxial with the longitudinal axis and positioned on either side of the support member, and each platform having a platform side facing away from the support member, wherein the platforms each have a convex surface on their platform side, and wherein each of the platform wheels is configured to rollingly engage one of the convex surfaces such that axial movement of the platforms causes a shift of the transmission.

94. The transmission of claim 93, wherein each wheel is affixed to the platform end of one of the plurality of spindle supports in a slot formed in the platform end of the spindle support that is adapted to house a platform wheel.

95. The transmission of claim 82, wherein each spindle support has at least three holes formed therethrough such that each spindle support is adapted to support one of the spindles, one of the stationary support wheels and one of the platform wheels.

96. A continuously variable transmission having a longitudinal axis, comprising;

a plurality of spherical power adjusters, wherein each power adjuster has a tiltable axis of rotation and a bore through its center, and wherein each power adjuster is located radially outward from the longitudinal axis;

a drive disc annularly rotatable about the longitudinal axis and contacting a first point on each of the power adjusters, and having a first side facing the power adjusters and a second side facing away from the power adjusters;

a generally annular output drive disc rotatable about the longitudinal axis and contacting a second point on each of the power adjusters;

a generally cylindrical support member annularly rotatable about and coaxial with the longitudinal axis and contacting a third point on each of the power adjusters;

a plurality of generally elongated spindles having two ends and a longitudinal axis, wherein each spindle is positioned in the bore of one of the power adjusters such that a movement of the axis of the spindle changes the axis of rotation of an associated power adjuster;

a plurality of spindle supports each having a platform end and a spindle end, wherein the spindle end of each spindle support is operably engaged with one of the two ends of one of the plurality of spindles, and wherein each of the spindle supports adjusts the axis of rotation of a power adjuster in response to the axial movement of the support member;

a plurality of stationary support wheels, wherein at least one stationary support wheel is operably attached to each spindle support, and wherein the stationary support wheels are adapted to guide the spindle support as the spindle support adjusts the axis of rotation of the poser adjusters;

a bearing disc annularly rotatable about the longitudinal axis of the transmission and positioned along the longitudinal axis near the second side of the drive disc;

annular first and second stationary supports each having a first side facing the power adjusters and a second side facing away from the power adjusters, each of the first and second stationary supports also having a concave surface on the first side, and wherein the first stationary support is located adjacent to the drive disc and the second stationary support is located adjacent to the output drive disc; and a coiled spring positioned between the bearing disc and the drive disc adapted to bias the drive disc to contact with the power adjusters.

97. The transmission of claim 96, wherein the coiled spring has a cross-section with a radial length greater than its axial thickness.

98. The transmission of claim 96, wherein the coiled spring has a cross-section that is substantially rectangular.

99. The transmission of claim 96, further comprising;

a generally tubular hollow shaft coaxial with the longitudinal axis of the transmission and having an end, which extends out of the transmission and has a set of external threads;

a rod having first and second ends and located coaxially within the hollow shaft;

a rotatable shifter for changing a transmission ratio of the transmission attatched to the first end of the rod and having a set of internal threads, wherein when the rotatable shifter is rotated the rod is moved axially; and a sleeve operably attached to the support member and the second end of the rod, and wherein axial movement of the rod causes the sleeve to move the support member, thereby shifting the transmission.

100. The transmission of claim 99, further comprising:

a shifter spring adapted to engage the rotatable shifter to bias the rotation of the rotatable shifter.

101. The transmission of claim 100, wherein the shifter spring has a first end and a second end and fits coaxially over the longitudinal axis of the transmission, and wherein the shifter spring is operably attached at its first end to the rod and is attached at the second end to a stationary object.

102. The transmission of claim 99, further comprising:

a generally tubular rotatable handlegrip;

a tether having a first end engaged with the handlegrip and a second end engaged with the rotatable shifter, wherein, the handlegrip is adapted to apply tension to the tether, and wherein the tether in turn actuates the rotatable shifter so as to axially align the support member, thereby shifting the transmission remotely.

103. A method of providing continuously variable transmission of an input rotation, the method comprising the steps of:

providing the input rotation from a driving disc;

applying the input rotation from the driving disc to one point on all of a plurality of spherical power adjusters and thereby rotating the power adjusters, wherein each power adjuster is adapted to rotate about an axis of rotation;

contacting the power adjusters with an output drive disc, thereby converting the input rotation to an output rotation of the output drive disc, wherein a speed of the output rotation is dependent upon the axis of rotation of the power adjusters;

supporting each of the plurality of power adjusters in their radial positions with a support member;

aligning axially the position of the support member with adjustment platforms; and adjusting the axis of rotation of the power adjusters by axially moving the support platforms.

104. The method of claim 1, further comprising the steps of;

creating an axial force proportional to a torque of the input rotation; and applying the axial force to the driving disc to prevent slipping between the drive disc and the power adjusters.

105. The method of claim 2, further comprising creating the axial force with two axial force generators.

106. The method of claim 2, further comprising disengaging the drive disc from the power adjusters when the input rotation ceases.

* * * * *